United States Patent [19]

Haag et al.

[11] 4,334,162

[45] Jun. 8, 1982

[54] RELEASABLE COMBINATION AND METHOD OF ASSEMBLY

[75] Inventors: Donald L. Haag, Sterling; Lee O. Woods, Morrison, both of Ill.

[73] Assignee: General Electric Company, Fort Wayne, Ind.

[21] Appl. No.: 131,218

[22] Filed: Mar. 17, 1980

[51] Int. Cl.³ ........................ H02H 5/04; H02K 11/00

[52] U.S. Cl. ........................................ 310/68 C; 361/27

[58] Field of Search ................. 310/68 C; 361/24, 25, 361/27, 29, 31; 200/303; 29/622

[56] References Cited

U.S. PATENT DOCUMENTS

| | | | |
|---|---|---|---|
| 4,037,316 | 7/1977 | Stoll | 29/622 |
| 4,042,860 | 8/1977 | Woods et al. | 361/25 C |
| 4,084,202 | 4/1978 | Stoll | 361/24 |
| 4,092,573 | 5/1978 | D'Entremont | 318/221 C |
| 4,250,368 | 2/1981 | Johnston et al. | 200/307 |

FOREIGN PATENT DOCUMENTS 1042126 9/1966 United Kingdom .

*Primary Examiner*—J. D. Miller
*Assistant Examiner*—D. L. Rebsch
*Attorney, Agent, or Firm*—Joseph E. Papin

[57] ABSTRACT

A releasable combination of a separable starter device and a separable protector device adapted for connection in circuit relation with a dynamoelectric machine. A PTCR (positive temperature coefficient resistor) in the starter device and a switch means in the protector device are adapted for association in thermal coupling relation when the starter device and the protector device are in the releasable combination thereof. One of the starter device and the protector device includes yieldable means extending generally circumferentially about at least a major circumferential portion of a part of the other of the starter device and the protector device for releasable engagement therewith so as to releasably maintain the starter device and the protector device against separation from the releasable combination thereof.

A method of assembling a releasable combination of a starter device and a protector device is also disclosed.

44 Claims, 20 Drawing Figures

RELEASABLE COMBINATION AND METHOD OF ASSEMBLY

FIELD OF THE INVENTION

This invention relates in general to electrical devices and in particular to a releasable combination of a separable starter device and a separable protector device adapted for use with a dynamoelectric machine and also a method of assembling such a releasable combination.

BACKGROUND OF THE INVENTION

In the past, various different types of combination starter-protector devices have been utilized in circuit relation with a winding circuit of a dynamoelectric machine. At least some of these past combination starter-protector devices utilized a positive temperature coefficient resistor (PTCR) which was operable generally to at least impede current flow to a start or auxiliary winding means of the dynamoelectric machine winding circuit generally as the dynamoelectric machine was energized to its preselected running or synchronous speed, and an overload protector was thermally coupled with the PTCR and subjected to the current in at least a run or main winding means of the dynamoelectric machine. Of course, the overload was operable to interrupt the current flow to the dynamoelectric machine in the event of the occurrence of a winding circuit overload condition which may have a deleterious affect on components of the dynamoelectric machine, such as for instance burning-out of the winding circuit. U.S. Pat. No. 4,161,681 issued July 17, 1979 to William C. Rathje, U.S. Pat. No. 4,131,871 issued Dec. 26, 1978 to Donald L. Haag and Lee O. Woods, U.S. Pat. No. 4,084,202 issued Apr. 11, 1978 to Donald H. Stoll, U.S. Pat. No. 4,042,860 issued Aug. 16, 1977 to Lee O. Woods and James P. Frank, and U.S. Pat. No. 4,037,316 issued July 26, 1977 to Donald H. Stoll illustrate some of the above-discussed combination starter-protector devices, as well as the operation thereof, in circuit with a dynamoelectric machine winding circuit, and each of these aforementioned patents is incorporated by reference herein.

The past combination starter-protector devices were associated in various manners with various types of dynamoelectric machines and other apparatus, such as for instance air conditioners or refrigerators having compressors or the like which utilized hermetic electric motors. In many of these compressor units, a Fusite plug or the like was mounted through a housing or jacket thereof, and such plug contained a plurality of male terminals connected internally of the compressor jacket with the winding circuit of the hermetic motor. The past combination starter-protector devices, such as for instance those illustrated in the aforementioned patents, were associated in electrical mounting engagement with the male terminals of the Fusite plug exteriorly of the compressor jacket. Of course, some of the past starter devices were of both the plug-on and plug-in type, as illustrated in U.S. Pat. Nos. 3,921,117 and 3,955,170, respectively. In some other installations, at least the starter device was electrically interconnected by a plurality of leads having quick-connect terminals which were associated with dynamoelectric machine terminals so as to be "hung" therefrom.

The past starter devices utilized a PTCR having a voltage rating, such as for instance 115 V or 230 V, which corresponded to the voltage rating of the particular apparatus or dynamoelectric machine with which such starter device was connected, and it is believed that at least some of such starting devices may have been interchangeable with several different models of such apparatus or dynamoelectric machines having the same voltage rating. While at least some of the past protector devices or overloads may have been interchangeably utilized with several compressor models and the respective hermetic motors thereof, it is believed that many such past protector devices were, in effect, "tailor-made" for operation with a specific compressor model and hermetic motor thereof utilized in apparatus of a specific manufacturer. In other words, it is believed that due to the particular operating characteristics of the aforementioned specific compressor model and hermetic motor thereof, a protector device which was operably compatible with one such specific compressor model and hermetic motor thereof may not have been operably compatible with another such specific compressor model and hermetic motor thereof. Therefore, it is believed to be advantageous to provide a releasable combination of a separable starter device and a separable protector device in which the starter device and the protector device can be readily interchanged with each other, i.e. separable or releasably secured to each other, so that different protector devices may be arranged in thermal coupling relation with the PTCR of the starter device. One such releasable combination of a separable starter device and a separable protector device is disclosed in the Lee O. Woods and Donald L. Haag application Ser. No. 119,648 filed Feb. 8, 1980 which is also incorporated herein by reference.

SUMMARY OF THE INVENTION

Among the several objects of the present invention may be noted the provision of an improved releasable combination of a separable starter device and a separable protector device adapted for connection in circuit relation with a winding circuit of a dynamoelectric machine and an improved method of assembling such a releasable combination which overcome at least some of the disadvantageous or undesirable features of the prior art; the provision of such improved releasable combination and method wherein a PTCR in the starter device and a bimetal switch element in the protector device are associated in thermal coupling relation and in predetermined spaced relation when the starter device and protector device are in the releasable combination thereof; the provision of such improved releasable combination and method in which the starter device and the protector device thereof are readily interchangeable with others thereof; the provision of such improved releasable combination and method in which yieldable means associated with one of the starter device and the protector device is disposed so as to extend generally circumferentially with respect to at least a major portion of a part of the other of the starter device and protector device for releasable engagement therewith so as to releasably maintain the starter device and the protector device against separation from the releasable combination thereof; and the provision of such improved releasable combination and method utilizing component parts which are simplistic in design, economically manufactured and easily assembled. These as well as other objects and advantageous features of the present invention will be in part apparent and in part pointed out hereinafter.

In general, a releasable combination of a separable starter device and a separable protector device in one form of the invention is adapted for connection in circuit relation with a winding circuit of a dynamoelectric machine. A PTCR in the starter device is adapted for association in thermal coupling relation with a switch means in the protector device when the starter device and the protector device are in the releasable combination thereof. Yieldable means is associated with one of the starter device and the protector device and disposed so as to extend generally circumferentially with respect to at least a major portion of a part of the other of the starter device and the protector device for releasable engagement therewith when the starter device and the protector device are in the releasable combination thereof so as to releasably maintain the starter device and the protector device against separation from the releasable combination thereof.

Also in general and in one form of the invention, a method is provided for assembling a releasable combination of a separable starter device and a separable protector device adapted for connection in circuit relation with a winding circuit of a dynamoelectric machine, and a PTCR in the starter device is adapted for thermal coupling relation with a switch means in the protector device when the starter device and the protector device are in the releasable combination thereof. In this method, a yieldable means associated with one of the starter device and the protector device is positioned so as to extend generally circumferentially with respect to at least a major portion of a part of the other of the starter device and the protector device for releasable engagement therewith so as to arrange the starter device and the protector device in their releasable combination with the PTCR and the switch means in their thermal coupling relation. In this manner, the starter device and the protector device are releasably maintained in their releasable combination against separation.

BRIEF DESCRIPTION OF THE DRAWINGS

Corresponding reference characters refer to corresponding parts throughout the several views of the drawings.

The exemplifications set out herein illustrate the preferred embodiments of the present invention in one form thereof, respectively, and it is understood that such exemplifications are not to be construed as limiting either the scope of the disclosure or the scope of the invention in any manner.

DETAILED DESCRIPTION OF THE PREFERRED EMBODIMENTS

Figure 1:
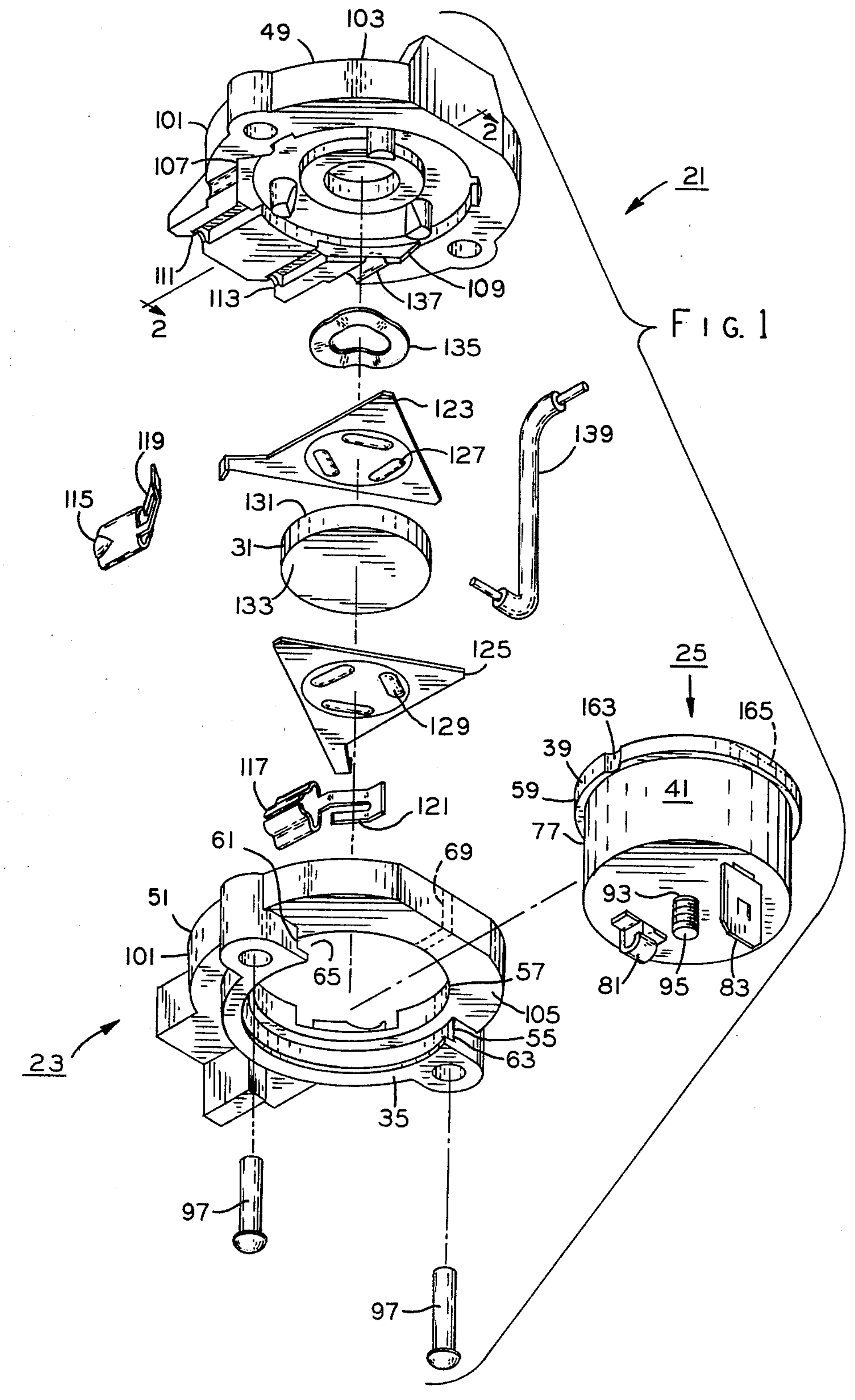
FIG. 1 is an exploded perspective view illustrating a releasable combination of a separable starter device and a separable protector device in one form of the invention and also illustrating principles which may be practiced in a method of assembling such releasable combination in one form of the invention.
Figure 2:
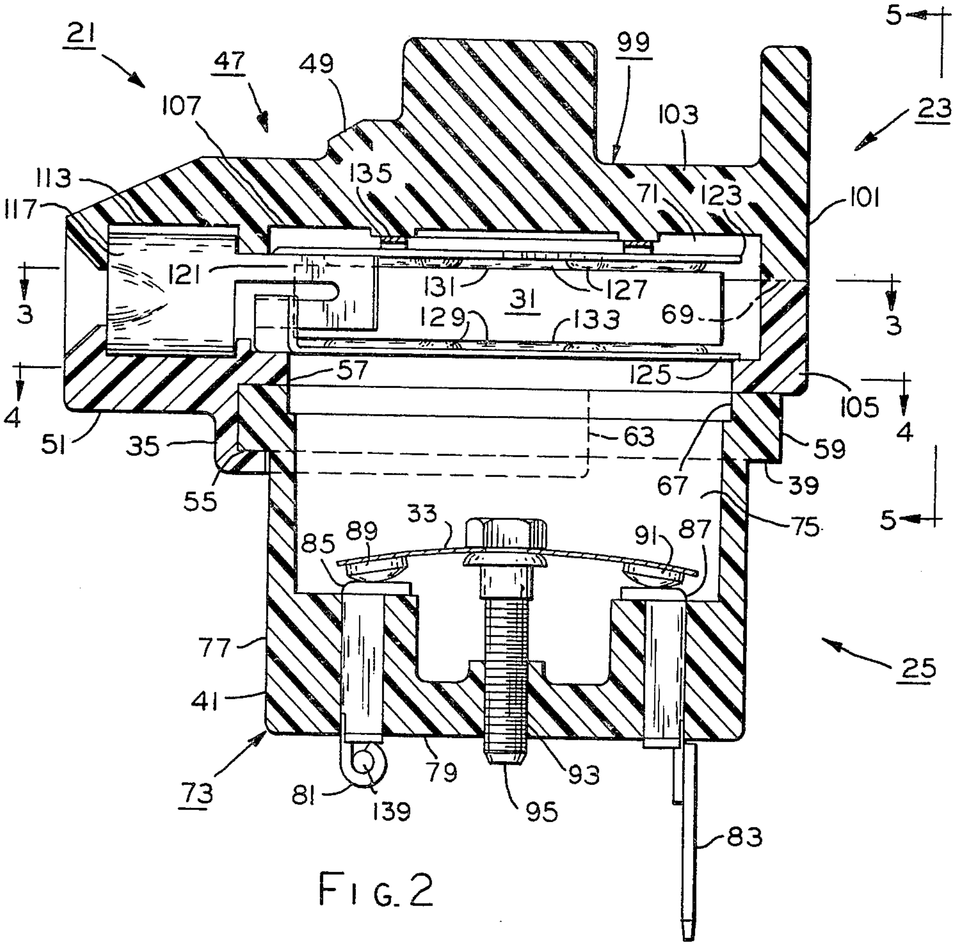
FIG. 2 is a sectional view taken along line 2—2 of FIG. 1 and illustrating in cross-section the starter device and the protector device in the releasable combination thereof.
Figure 4:
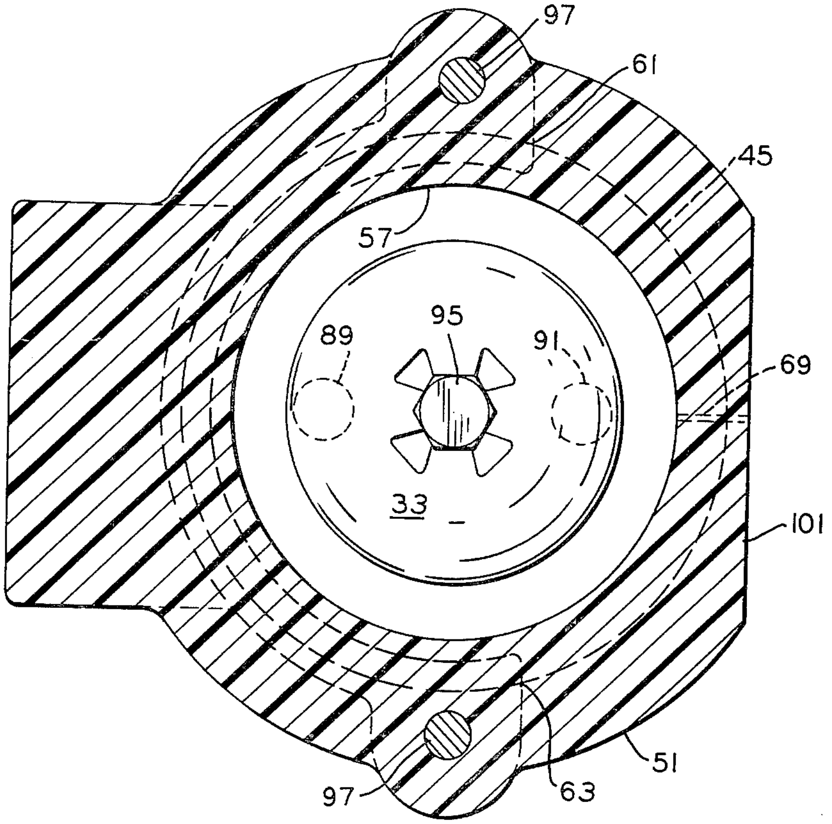
FIG. 4 is a sectional view taken along line 4—4 of FIG. 2.

Referring now to the drawings in general, a method is illustrated in one form of the invention for assembling a releasable combination 21 of a separable starter device 23 and a separable protector device 25 adapted for connection in circuit relation with a winding circuit 27 of a dynamoelectric machine 29, and a PTCR 31 in the starter device is adapted for thermal coupling relation with a switch means or device, such as a bimetal switch element 33 for instance, in the protector device when the starter device and the protector device are arranged in a preselected assembly position, i.e., in the releasable combination thereof (FIGS. 1-5 and 19). In this method, yieldable means 35 (as discussed in greater detail hereinafter) associated with one of starter device 23 and protector device 25 is positioned, disposed or otherwise arranged so as to extend generally circumferentially with respect to at least a major portion 37 of a part 39 of the other of the starter device and the protector device for releasable engagement therewith so as to arrange the starter device and the protector device in the releasable combination 21 with PTCR 31 and bimetal switch element 33 in their thermal coupling relation (FIGS. 1, 2 and 4). In this manner, starter device 23 and protector device 25 are releasably maintained or otherwise secured in the releasable combination 21 thereof against separation.

More particularly and with specific reference to FIGS. 1-5, protector device 25 is provided with a generally cylindric casing or casing means 41 having bimetal switch element 33 contained or otherwise mounted therein, and a radially extending flange defining the aforementioned part 39 of the protector device is integrally formed with the casing extending generally circumferentially thereabout. Protector device 25 is a model 3ARG11 overload available from the General Electric Co., Morrison, Illinois, and is discussed in greater detail hereinafter.

Starter device 23 is provided with a housing or housing means, indicated generally at 47, and the housing comprises a pair of housing members 49, 51. Housing members 49, 51 may be formed of any suitable material, such as a resin or the like for instance, having suitable dielectric properties; however, in addition, the material from which at least lower housing member 51 is formed must have, at least to some preselected degree, a yieldable or resilient characteristic. Yieldable means, such as a partial generally annular flange 35 or the like having a groove or groove means 55 therein, for receiving seating or otherwise accommodating casing flange 39 is integrally formed with lower housing member 51 so as to depend exteriorly therefrom and extend in a pocket-like configuration generally coaxially about an opening 57 provided through the lower housing member to communicate with PTCR 31 contained therein, and groove 55 defines a means for seating casing flange 39 or for seating engagement therewith. It may be noted that yieldable means or housing flange 35 is sized so as to extend generally circumferentially about major portion 37 of the circumference of casing flange 39 when starter device 23 and protector device 25 are in the releasable combination 21 thereof. Further and due to the resilient characteristics of the material from which lower housing member 51 is formed, it may be noted that yieldable means or housing flange 35 defines a yieldable section of housing 47.

In the assembly of starter device 23 and protector device 25 into the releasable combination 21 thereof, casing 41 of the protector device is moved or otherwise positioned so as to abut a marginal edge 59 of casing flange 39 in interfering engagement with a pair of opposed adjacent free ends or free end portions, such as abutments 61, 63, on housing flange 35. When so engaged with free end portions 61, 63 on housing flange 35, casing flange 39 is aligned or otherwise registered with a means, such as passage 65, for the passage thereof into seating or supporting engagement with the housing flange, and passage or passage means 65 in the housing flange is generally defined between free ends portions 61, 63 thereof. It may be noted that the distance or extent of passage 65 between free end portions 61, 63 is predeterminately less than the diameter of casing flange 39 so as to inhibit the free passage or movement of the casing flange through passage 65. With casing flange 39 so aligned with passage 65 and in interfering engagement with free end portions 61, 63 of housing flange 35, an assembly force is applied on at least one of starter device 23 and protector device 25; and, in response to this applied or assembly force acting through the interfering engagement between the casing flange and the free end portions of the housing flange, the housing flange yields or is resiliently displaced or otherwise stressed from generally an at-rest position thereof toward a displaced or stressed position. Thus, free end portions 61, 63 and housing flange 35 are conjointly displaced therewith or otherwise stressed or spread apart into displaced positions, respectively, so as to expand or otherwise enlarge opening 65 between the free end portions. Upon this spreading apart of free end portions 61, 63 on housing flange 35, the applied assembly force effects the insertion or passage of casing flange 39 through the now expanded passage 65 between the spread apart free ends of the housing flange into a preselected assembly position supported or otherwise maintained in displacement preventing or seating engagement within groove 55 of the housing flange. With casing flange 39 and housing flange 35 so arranged in the preselected assembly position thereof, the assembly force is, of course, removed and the housing flange and its free end portions 61, 63 resile or otherwise relax or return from their respective displaced positions toward the at-rest or unstressed position thereof. Upon this return movement or resiling of housing flange 35 toward its at-rest position, free end portions 61, 63 thereof are resiliently urged toward gripping or at least displacement preventing engagement with confronting parts of marginal edge 59 on casing flange 39. Thus, with casing 41 and housing 47 in the preselected assembly position thereof, it may be noted that protector device 25 is releasably received, retained or otherwise maintained in the releasable combination 21 with starter device 23 against separation by the seating engagement of casing flange 39 in groove 55 of housing flange 35 and also by the displacement preventing engagement of free end portions 61, 63 on the housing flange with the casing flange thereby to obviate its return passage through passage 65 in the housing flange. Casing 41 of protector device 25 is provided with an opening 67 therethrough communicating with bimetal switch element 33 contained within the casing, and it may be noted that when the protector device and starter device 23 are in the releasable combination thereof, i.e. in the preselected assembly position, opening 57 in housing 47 and opening 67 in casing 41 are generally aligned or otherwise communicated with each other so as to place or otherwise arrange or communicate PTCR 31 and bimetal switch element 33 in thermal coupling relation with each other through openings 57, 67.

Of course, it is contemplated that the above-discussed assembly of starter device 23 and protector device 25 into the releasable combination 21 thereof may be effected either while the releasable assembly is associated with dynamoelectric machine 29, as discussed hereinafter, or while disassociated therefrom within the scope of the invention so as to meet the objects thereof. In the event it is desirable to interchange either starter device 23 or protector device 25 with others thereof, releasable assembly 21 may, of course, be disassembled. To effect such disassembly of releasable combination 21, a disassembly force is applied or otherwise exerted on at least one of starter device 23 and protector device 25 in a direction to effect separation of the starter device and the protector device from the preselected assembly position thereof. In response to the applied or disassembly force, marginal edge 59 of casing flange 39 is again forced into interfering engagement with free end portions 61, 63 of housing flange 35 to effect the yielding or displacement movement of the housing flange and its free end portions to the respective displaced positions thereof. In this manner, free end portions 61, 63 are again spread apart so as to expand passage 65 in housing flange 35 and accommodate the return passage or movement therethrough of casing flange 39 from its preselected assembly position in seating engagement with groove 55 of the housing flange to a position separated therefrom. Thus, in view of the foregoing, it may be noted that the releasable engagement of starter device 23 and protector device 25 in the releasable combination 21 thereof not only serves to releasably maintain the starter device and the protector device against separation from the releasable combination thereof but also facilitates disassembly of the starter device and protector device in a quick and efficient manner.

If a greater amount of resiliency or yieldability is desired for housing flange 35 than the material from which it is formed can afford, it is contemplated that at least lower housing member 51 may be bifurcated or slotted, as shown by bifurcating slot 69 in dotted outline in FIGS. 1–5 for instance, within the scope of the invention so as to meet the objects thereof. When slot 69 is utilized, it, of course, extends through lower housing member 51 so as to intersect with a chamber 71 of housing 47 in which PTCR 31 is disposed and also with opening 57, and the slot may be located so as to directionally extend generally between free end portions 61, 63 of housing flange 35. In the event that slot 69 is utilized, it may be noted that the aforementioned yieldable section of housing 47 not only includes housing flange 35 but also that portion of lower housing member 51 which is yieldable due to the provision of slot 69 therein upon the above-discussed assembly and disassembly of starter device 23 and protector device 25.

Figure 5:
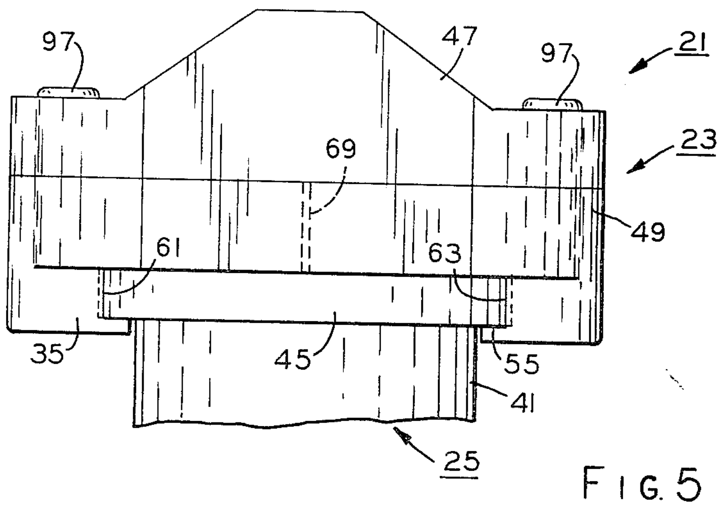
FIG. 5 is a partial right side elevational view of the releasable combination of FIG. 1.

With reference again in general to the drawings and recapitulating at least in part with respect to the foregoing, there is illustrated in one form of the invention the releasable combination 21 of starter device 23 and protector device 25 adapted for connection in circuit relation with winding circuit 27 of dynamoelectric machine 29, and a switch means, such as bimetal switch element 33 for instance, in protector device 25 is adapted for association in thermal coupling relation with PTCR 31 in the starter device when the starter device and the protector device are in the releasable combination 21 thereof (FIGS. 1–5 and 18). Yieldable means, such as for instance at least yieldable housing flange 35, is associated with starter device 23 and disposed so as to extend generally circumferentially with respect at least major portion 37 of a part, such as for instance casing flange 39, of protector device 25 for releasable engagement therewith so as to seat or otherwise position the starter device and the protector device in releasable displacement preventing engagement against separation from the releasable combination 21 thereof (FIGS. 2, 4 and 5).

More particularly and with specific reference to FIGS. 1–5, casing 41 of protector device 25 may be molded or otherwise formed of a suitable dielectric material, such as a resin or the like for instance, and the casing has a plurality of walls or wall means, indicated generally at 73, which define another chamber 75 within the casing. Wall means pluralty 73 of casing 41 includes a generally annular or cylindric sidewall or sidewall means 77 integrally interposed between a lower end wall means or base wall 79 and flange 39 which extends generally radially or away from the sidewall at least generally adjacent the upper end thereof. In this manner, flange 39 and base wall 79 comprise a pair of end walls or end wall means which are integrally formed with sidewall 77 at least generally adjacent the opposite ends thereof, and passage or opening 67 extends through flange or end wall 39 so as to communicate with chamber 75. Flange 39 is provided with marginal edge 59 extending generally circumferentially thereabout.

A pair of terminals 81, 83 extend through base wall 79 of casing 41 being integrally molded therewith or otherwise retained in the base wall by suitable means, and the interior end portions of the terminals respectively define a pair of contacts or contact means 85, 87 adapted for making and breaking with bimetal switch element 33. Contacts 85, 87 are arranged within casing chamber 75 generally adjacent base wall 79 while the exterior ends or end portions of terminals 81, 83 define electrical connector sections thereof. Bimetal switch element 33 is generally disc-shaped, and another pair of contact or contact means 89, 91 are carried by the bimetal switch element for making and breaking with contacts 85, 87 of terminals 81, 83, respectively. As shown, when bimetal element 33 is in an at-rest or circuit completing position thereof, contacts 89, 91 of the bimetal switch element are disposed in circuit making engagement with contacts 85, 87 of terminals 81, 83. Bimetal switch element 33 is generally centrally mounted to or carried on an adjusting screw 93 which is adjustably or threadedly received in a threaded aperture or opening 95 in base wall 79 of casing 45 to adjust the bias on bimetal switch element 33 urging its movable contacts 89, 91 into making engagement with stationary contacts 85, 87 of terminals 81, 83, respectively. Thus, it may be noted that at least bimetal switch element 33 comprises a switch means or device adapted for operation between circuit making and breaking positions so as to be current carrying when connected in circuit relation with winding circuit 27 of dynamoelectric machine 29, as discussed hereinafter, and such switch means is also thermal responsive. While bimetal switch element 33 is presented herein for purposes of disclosure, it is contemplated that other types of switch means having various other configurations may be utilized within the scope of the present invention so as to meet the objects and advantageous features thereof.

Housing members 49, 51 of starter device 23 generally mate together being fixedly retained by suitable means, such as a pair of rivets 97 or the like for instance; however, it is contemplated that the housing members may be so mated or connected with each other by suitable means other than the rivets within the scope of the invention so as to meet the objects thereof. Housing members 49, 51 comprise a plurality of walls or wall means, indicated generally at 99, which define chamber 71 within housing 47. Wall means plurality 99 includes a sidewall or sidewall means 101 integrally formed or otherwise connected between a pair of opposite, spaced apart end walls or end wall means 103, 105, and opening 57 is provided through lower end wall 105 so as to intersect or otherwise communicate with chamber 71 of housing 47. Housing flange 35 is integrally formed with lower end wall 105 so as to depend therefrom generally coaxially about opening 57 in the lower end wall. Chamber 71 includes a pair of recesses 107, 109 provided in sidewall 101, and a pair of terminal receiving, spaced apart apertures 111, 113 extend through the sidewall having interior ends intersecting with the recesses and exterior ends opening exteriorly of housing 47. Of course, if desired, slot 69, as shown in dotted outline form in FIGS. 1–5, may be provided through sidewall 101 and end wall 105 so as to intersect with chamber 71 and opening 57 with the slot extending between face end portions 61, 63 of housing flange 35, and when slot 69 is so provided, at least a part of sidewall 101 and end wall 105 define with housing flange 35 the yieldable section of housing 47, as previously mentioned.

A pair of female terminal or terminal means 115, 117 are positioned or otherwise contained within housing apertures 111, 113 so as to be accessible from exteriorly of housing 47, and the female terminals respectively include means, such as supporting or connection sections illustrated as generally U-shaped configurations or tabs 119, 121 for electrical and mechanical connection with a pair of contact plates 123, 125. If a more detailed description of female terminals 115, 117, their assembly within housing apertures 111, 113, and their function with respect to contact plates 123, 125 is desired reference may be had to the Donald F. Haag et al. U.S. Pat. No. 4,131,871 issued Dec. 26, 1978 which, as previously mentioned, is incorporated herein by reference. Of course, while female terminals 115, 117 are illustrated herein for purposes of disclosure, it is contemplated that other terminals having different configurations may be utilized within the scope of the present invention so as to meet the objects and advantageous features thereof.

Contact plates 123, 125 are also illustrated for purposes of disclosure as having a generally flat triangular shape, but it is contemplated that other contact plates having various other shapes or configurations may be employed within the scope of the present invention so as to meet the objects and advantageous features thereof. Contact plate 125 is predeterminately seated or otherwise supported within housing chamber 71 at least in abutting engagement with recesses 107, 109 in sidewall 101 of housing 47 so as to extend at least in part across opening 57 through end wall 105 of the housing, and contact plates 123, 125 are also fixedly connected by suitable means, such as soldering or welding or the like for instance, with tabs 119, 121 of female terminals 115, 117. A plurality of indentations or dimples 127, 129 may be provided in contact plates 123, 125 so as to insure good electrical contacting and supporting engagement with a pair of opposite contact sides 131, 133 of PTCR 31 which, as previously mentioned, is embraced between the contact plates within housing chamber 71; however, it is contemplated that various configurations other than the illustrated dimples may be utilized in the contact plates within the scope of the invention so as to meet the objects thereof. Of course, spring means, such as a wavy washer type spring 135 or the like for instance, may be interposed or otherwise interconnected between end wall 103 of housing 47 and contact plate 123 so that the compressive force of the spring urges contact plate 123 into engagement with contact side 131 of PTCR 31 and urges the other opposite contact side 133 thereof into engagement with contact plate 125. It is contemplated that other spring means, including but not limited to those integrally formed with a contact plate for instance, may be utilized within the scope of the invention so as to meet the objects thereof.

Figure 19:
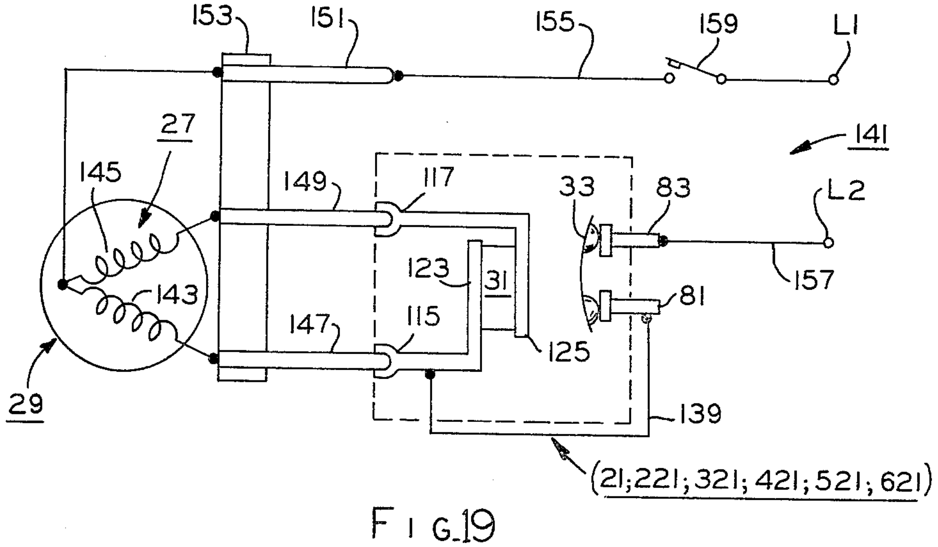
FIG. 19 is a schematic diagram of an exemplary circuit illustrating the releasable combinations of the present invention connected in circuit relation with a winding circuit of a dynamoelectric machine.

When releasable combination 21 is connected in the circuit relation with winding circuit 27 of dynamoelectric machine 29, as discussed in greater detail hereinafter and as best seen in FIG. 19, PTCR 31 is operable generally in response to current flow therethrough to increase its resistance generally as a function of its temperature, as illustrated graphically and by way of example in FIG. 18, and when so energized, the PTCR generates or emits heat. Thus, when housing 47 and casing 41 of releasable combination 21 are assembled together in the preselected assembly position, as previously discussed, PTCR 31 and bimetal switch element 33 are associated in thermal coupling relation, and any heat emitted from the PTCR may pass through openings 57, 67 respectively in the housing and casing toward the bimetal switch element. Of course, opposite contact sides 131, 133 of PTCR 31 are coated or otherwise layered or covered with a suitable electrode, such as a chemical composition, a metal or alloy thereof, a glass or glass-like material, or a combination thereof for instance (not shown), so as to insure the generally even or constant flow or distribution of current through the PTCR between the opposite contact sides thereof. While PTCR 31 is shown herein as having a generally cylindric shape, it is contemplated that a PTCR having a shape other than generally cylindric may be employed within the scope of the invention so as to meet the objects thereof.

To complete the description of releasable combination 21, a lead receiving opening or aperture 137 is provided through sidewall 101 of housing 47 intersecting with recess 107 thereof, and an electrical lead 139 extends through the lead receiving opening having an interior end electrically connected with supporting section 119 of female terminal 115 and an exterior end which may be releasably connected in electrical engagement with terminal 81 of protector device 25. Of course, lead 139 defines, at least in part, circuit means in which terminal 81 and contact plate 123 are placed in series relation across PTCR 31 with contact plate 125; however, it is contemplated that others of such circuit means, such as for instance as shown in the Lee O. Woods U.S. Pat. No. 4,042,860 issued Aug. 16, 1977 and incorporated by reference herein, may be employed within the scope of the present invention so as to meet the objects and advantageous features thereof.

In the operation of releasable combination 21 as illustrated in an exemplary schematic diagram of a circuit 141 in FIG. 19, winding circuit 27 of dynamoelectric machine 29 is provided with main winding means, such as a run winding 143 for instance, and auxiliary winding means, such as a start winding 145 for instance, connected in circuit relation. An assembly or set of mounting or male terminals or terminal means 147, 149, 151 are fixedly mounted in a plug 153 or the like adapted for mounting assembly or association with a structural component (not shown) in which dynamoelectric machine 29 may be housed; however, it is contemplated that terminal plug 153 may be remotely mounted with respect to the dynamoelectric machine to another structural component, such as a jacket or housing for instance, of a device, such as a compressor or the like for instance (not shown), driven by the dynamoelectric machine. Male terminals 147, 149 are respectively connected with run and start windings 143, 145 of dynamoelectric machine 29, and male terminal 151 is connected in circuit relation with both of the run and start windings. Female terminals 115, 117 of releasable combination 21 are disposed to releasably receive male terminals 147, 149 in electrical conductive plug-on relation when the releasable combination is associated in circuit relation with dynamoelectric machine 29, and a pair of leads 155, 157 are respectively connected between line or power terminals L1, L2 and male terminal 151 of plug 153 and terminal 83 of protector device 25, respectively. To complete the description of circuit 141, a motor energizing or on-off switch 159 may be interposed in line 155.

In the operation of releasable combination 21 when assembled onto plug 153, an operator may energize dynamoelectric machine 29 across line terminals L1, L2 by closing switch 159. In this manner, power is supplied from line terminal L1 through closed switch 159, lead 155 and male terminal 151 to both run winding 143 and start winding 145 of dynamoelectric machine 29. From start winding 145, current flows through male terminal 149, female terminal 117 of releasable combination 21, contact plate 125, PTCR 31, contact plate 123, female terminal 115, lead 139, terminal 81, and bimetal switch element 33 to terminal 83 and therefrom through lead 157 to line terminal L2. At the same time, current also passes in parallel circuit relation from run winding 143 through male terminal 147 to female terminal 115 of releasable combination 21, lead 139, terminal 81 and bimetal switch element 33 to terminal 83 and therefrom through lead 157 to line terminal L2.

Figure 18:
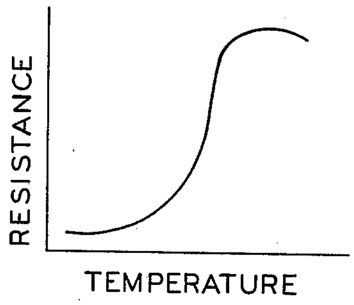
FIG. 18 is a graphical representation illustrating exemplary resistance and temperature characteristics of PTCR as may be utilized in the releasable combinations of the present invention.
Figure 3:
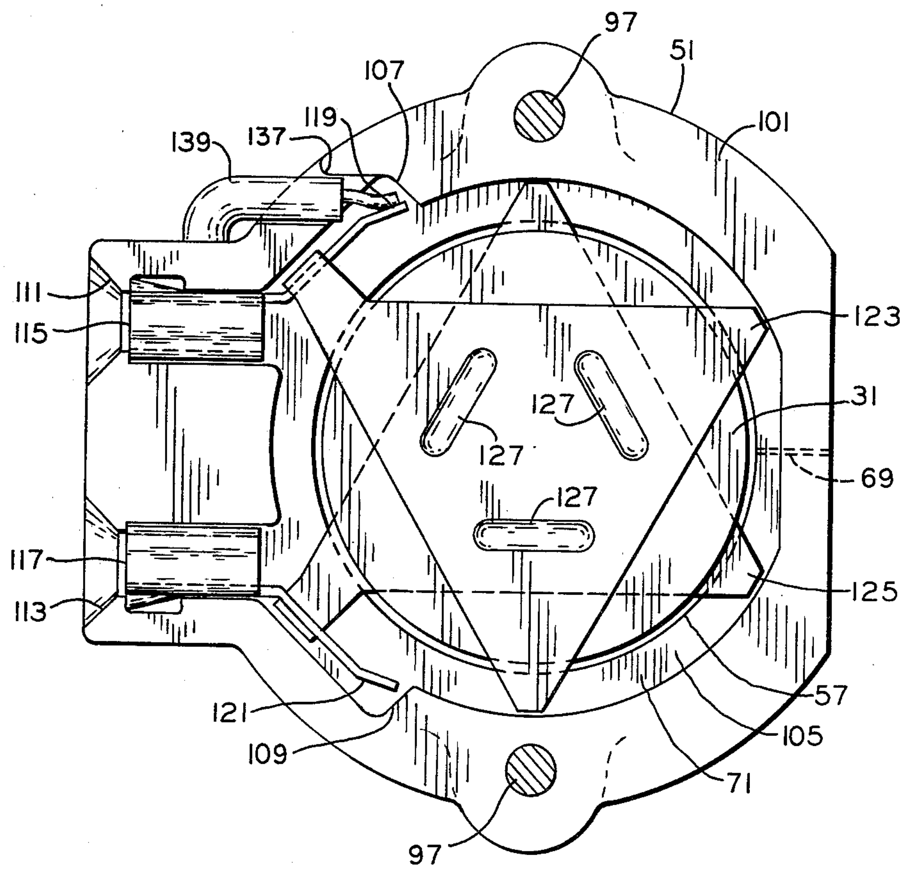
FIG. 3 is a sectional view taken along line 3—3 of FIG. 2.

A previously mentioned and as graphically illustrated in FIG. 18, PTCR 31 is operable generally in response to current flow therethrough to increase its resistance generally as a function of its temperature; therefore, assuming the temperature of the PTCR to be rather low at the beginning of the start-up period of dynamoelectric machine 29 when switch 159 is closed, the PTCR will initially pass current at a value sufficiently great enough to effect a desired starting torque of the dynamoelectric machine during the start-up period thereof. As the temperature of PTCR 31 increases in response to the current flow therethrough, its resistance to such current flow also increases to a value which generally renders start winding 145 ineffective in winding circuit 27 of dynamoelectric machine 29 so as to electrically disassociate the start winding from run winding 143. The point of time during the start-up period of dynamoelectric machine 29 at which start winding 145 may be disabled or rendered ineffective, as previously mentioned, may be predetermined so as to generally coincide with the desired running speed of dynamoelectric machine 29. Of course, PTCR 31 will not act to obviate current flow through start winding 145 during the start-up period of dynamoelectric machine 29, but the PTCR will throttle or restrict the passage of such current flow to such a minimal or small value that the start winding is ineffective in winding circuit 27 of the dynamoelectric machine. Of course, when the operator opens switch 159, circuit 141 is interrupted across line terminals L1, L2, and dynamoelectric machine 29 is deenergized.

As well known in the art, overload conditions may deleteriously affect components of a dynamoelectric machine, such as for instance shorting or burning-out of the winding circuit in such dynamoelectric machine. These overload conditions may be effected by a plurality of different causes or by various combinations of such causes. For instance, some of the well known causes of motor overload conditions are: a running overload; a high temperature overload; an overload occasioned by a stalled or locked rotor; and a high current overload. Irrespective of the particular cause or combination of causes effecting an overload condition, a deleteriously high current is drawn by the dynamoelectric machine, and such high current is usually accompanied by or results in a high temperature. Therefore, for the sake of simplifying the discussion of overload conditions herein, it is to be understood that any cause for affecting such an overload condition will be discussed only within the context of a high current draw or current overload condition accompanied by a high temperature condition with respect to winding circuit 27 of dynamoelectric machine 29.

In the event of the occurrence of an overload or high current condition in dynamoelectric machine 29, a relatively large amount of current may be drawn in circuit 141 which could deleteriously affect run and start windings 143, 145, as discussed above. However, bimetal switch element 33 is responsive to the aforementioned high current and temperature increase to correspondingly increase the heat generated thereby and to effect characteristic snap-action of the bimetal switch element to a circuit interrupting position breaking its contacts 89, 91 from stationary contacts 85, 87 of terminals 81, 83. In this manner, circuit 141 is opened effecting deenergization of dynamoelectric machine 29 and isolating or electrically disassociating winding circuit 27 of the dynamoelectric machine from the current overload which may then exist in the dynamoelectric machine across line terminals L1, L2.

Of course, the opening of circuit 141 in response to the snap-action movement of bimetal switch element 33, as discussed above, also effects the deenergization and the resultant cooling of PTCR 31. Even with the supplemental heat supplied or radiated from PTCR 31 through openings 57, 67 in housing 47 and casing 41 of releasable combination 21 to bimetal switch element 33, the bimetal switch element may cool sufficiently in its circuit breaking or interrupting position so as to cycle several or a plurality of times between such circuit interrupting position and the circuit completing position thereof. Such cycling of bimetal switch element 33 may occur throughout or over a predetermined relatively short period of time, and such cycling is only effective to replace dynamoelectric machine 29 in circuit relation across line terminals L1, L2 for relatively very short periods of time. When bimetal switch element 33 is so cycled to its circuit completing position, PTCR 31 is, of course, reenergized to again supply heat to the bimetal switch element during the aforementioned relatively short period of time thereby to again assist the cyclical movement or thermal actuation of the bimetal switch element to its circuit interrupting position. Even though bimetal switch element 33 may cycle, as discussed above, for a brief period of time subsequent to the occurrence of the overload conditions in dynamoelectric machine 29, it is believed that the supplemental heat transferred mainly by radiation from PTCR 31 to bimetal switch element 33 is effective to increase the "off-time" thereof, i.e., when the bimetal switch element is in its circuit interrupting position, through the aforementioned predetermined relative short period of time. Thus, it may be noted that the predeterminately increased "off-time" of bimetal switch element 33 ocasioned by the supplemental heat supplied or transferred from PTCR 31 allows the PTCR to cool. As PTCR 31 cools, the resistance thereof is correspondingly reduced generally as a function of the decreasing temperature thereof. When the resistance and temperature of PTCR 31 are reduced to a sufficiently low value, the PTCR will again permit the passage therethrough of the current at a value sufficiently great enough to effect the restarting of dynamoelectric machine 29. Therefore, when bimetal switch element 33 also cools enough to cycle or return to its uninterrupted circuit completing position, current is drawn through PTCR 31 at values great enough to again effect the reenergization of winding circuit 27 in dynamoelectric machine to bring it up to its predetermined running speed, as discussed hereinabove. When dynamoelectric machine 29 is so reenergized to attain its running speed, the self-heating effect of PTCR 31 once again raises its temperature and its resistance value as a function thereof to reduce the current flow therethrough to a value again rendering start winding 145 ineffective in winding circuit 27 of dynamoelectric machine 29. Thus, the restarting of dynamoelectric machine 29 assumes that the cause of the overload condition has been alleviated or corrected, and if not so alleviated, releasable combination 21 may again operate or function to open circuit 141 taking dynamoelectric machine 29 off the line across line terminals L1, L2, as previously described.

Casing flange 39 of protector device 25 has a pair of generally diametrically opposite notches 161, 161*a* extending into marginal edge 59 thereof although only one such notch is shown in FIG. 1. In some models of the protector device, as indicated generally at 25*a* in FIG. 7A, a flat 163 is provided on a casing flange 39*a* intermediate notches 161, 161*a* thereof, as illustrated in FIG. 7A and discussed in detail hereinafter.

Figure 6:
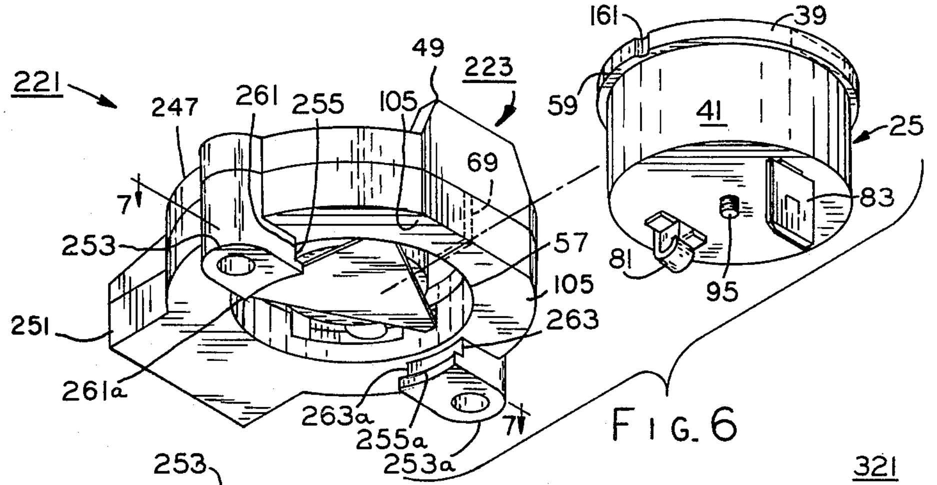
FIGS. 6, 8, 13 and 15 are exploded perspective views illustrating alternative embodiments of a releasable combination of a separable starter device and a separable protector device in one form of the invention, respectively, and also illustrating principles which may be practiced in alternative methods of assembling such releasable combinations in one form of the invention, respectively.
Figure 7:
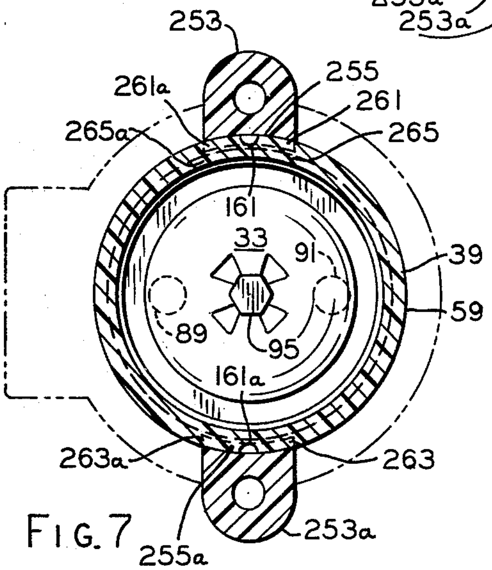
FIG. 7 is a sectional view taken along line 7—7 of FIG. 6.
Figure 7A:
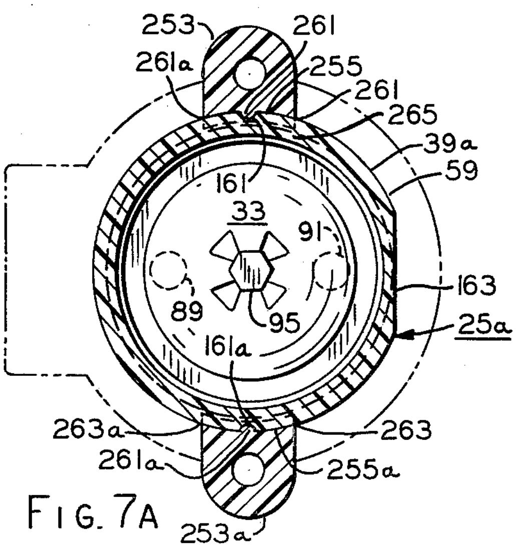
FIG. 7A is generally the same as FIG. 7 with detents illustrated on the starter device to accommodate notches on the protector device.

With reference to FIGS. 6 and 7, another or an alternative releasable combination 221 is illustrated in one form of the invention having generally the same component parts and functioning in circuit 141 generally in the same manner as the above discussed releasable combination 21 with the exceptions noted hereinafter. While releasable combination 221 is believed to meet at least some of the objects and advantageous features set out hereinbefore, it is believed that releasable combination 221 may also have indigenous objects and advantageous features as may be in part apparent and in part pointed out hereinafter.

In releasable combination 221, a starter device 223 is provided with a housing 247 comprising upper housing member 49 and a lower housing member 251 which may be formed of the same material previously discussed herein with respect to lower housing member 51 of starter device 25. Lower housing member 251 of housing 247 includes yieldable means, such as a pair of generally opposed flanges or split flange means 253, 253*a* for instance, integrally formed on lower end wall 105 of the lower housing member so as to depend therefrom at least generally adjacent opening 57 through the lower end wall and generally at diametrically opposite portions of the opening, and a pair of means, such as generally arcuate grooves or groove means 255, 255*a* for instance, for seating or otherwise receiving casing flange 39 of protector device 25 are provided in the flanges. Means, such as a pair of opposed free end portions or abutments 261, 263 for instance, are provided adjacent one side of flanges 253, 253*a* for interfering engagement with casing flange 39, and the interfering engagement means or free end portions define therebetween a means, such as a passage 265, for the passage therethrough of the casing flange. Means, such as another pair of opposed free end portions or abutments 261*a*, 263*a* for instance, are also provided adjacent the other side of flanges 253, 253*a* for interfering engagement with casing flange 39, and these free end portions 261*a*, 263*a* or interfering engagement means also define therebetween means, such as another passage 265*a*, for the passage therethrough of the casing flange. Of course, housing flanges 253, 253*a* and seating means or grooves 255, 255*a* thereof are sized to receive or otherwise accommodate casing flange 39. Thus, it may be noted that the circumferential spacing of free end portions 261, 263 and 261*a*, 263*a* on housing flanges 253, 253*a* are arranged so as to be disposed generally with respect to at least a major portion of the circumference of casing flange 39 when starter device 223 and protector device 25 are assembled into the releasable combination 221 thereof, as discussed hereinafter. In other words, the extent or distance across passages 265, 265*a* between free end portions 261, 263 and 261*a*, 263*a* are respectively predeterminately sized to be less than the diameter of casing flange 45, so as to extend across a minor portion of the circumference of casing flange 39.

In the assembly of releasable combination 221, it is readily apparent that casing flange 39 may be passed or otherwise inserted through either of passages 265, 265*a* into its seating engagement with grooves 255, 255*a* of housing flanges 253, 253*a*; however, for the sake of brevity, such assembly is discussed hereinafter only in terms of the passage of the casing flange through passage 265. To effect this assembly, marginal edge 59 of casing flange 39 is initially moved or otherwise positioned or registered in interfering engagement with free end portions 261, 263 of housing flanges 253, 253*a*, and thereafter an assembly force is applied or otherwise exerted on at least one of starter device 223 and protector device 25. In response to this applied or assembly force acting through the interfering engagement of casing flange 39 with free end portions 261, 263 of housing flanges 253, 253*a*, the housing flanges yield or are resiliently displaced or otherwise stressed from the at-rest rest position thereof toward a displaced or stressed position, and of course, the free end portions of the houisng flanges are conjointly moved therewith so as to be spread apart. When free end portions 261, 263 are so spread apart or otherwise yielded to the respective displaced positions thereof, passage 265 therebetween is, of course, conjointly expanded or otherwise enlarged to permit or otherwise accommodate the entry or passage of casing flange 39 therethrough into a preselected assembly position supported or otherwise maintained in displacement preventing engagement or seating engagement with grooves 255, 255*a*, respectively. Upon the disposition of casing flange 39 into the preselected assembly position thereof, housing flanges 253, 253*a* resile or otherwise return toward the at-rest position thereof, and such return movement of the housing flanges resiliently urges free end portions 261, 263 and 261*a*, 263*a* thereof toward gripping or at least displacement preventing engagement with confronting parts of marginal edge 59 on casing flange 39. Thus, it may be noted that protector device 25 is releasably received, retained or otherwise maintained in the releasable combination 221 with starter device 223 against separation by the engagement of casing flange 39 with grooves 255, 255*a* of housing flanges 253, 253*a* and also by the displacement preventing engagements of free end portions 261, 263 and 261*a*, 263*a* with confronting parts of marginal edge 59 on casing flange 39 thereby to prevent its return or displacement passage through either passage 265 or 265*a*. Of course, with starter device 223 and protector device 25 in the releasable combination 221 thereof, PTCR 31 and bimetal switch element 33 are connected in thermal coupling relation through openings 57, 67 in the starter device and the protector device, respectively.

In the event that protector 25*a* having casing flange 39*a* is utilized in the releasable combination 221 with starter device 223, as illustrated in FIG. 7A, there is, of course, always the possibility that casing flange 39*a* might be rotated or otherwise positioned in its seating engagement in grooves 255, 255*a* of housing flanges 253, 253*a* so that flat 163 on the casing flange could become aligned with passages 265, 265a which may effect undesirably displaceable therethrough. In order to obviate this undesirable displacement of casing flange 39a from its preselected assembly position through passages 265, 265a, a pair of generally opposite detents 261, 261a are provided on housing flanges 253, 253a, for gripping or releasable engagement with notches 161, 161a in casing flange 39a of protector 25a upon the assembly of the protector device having casing flange 39a with starter device 223 generally in the same manner as the assembly of protector device 25 therewith, as discussed above.

Figure 8:
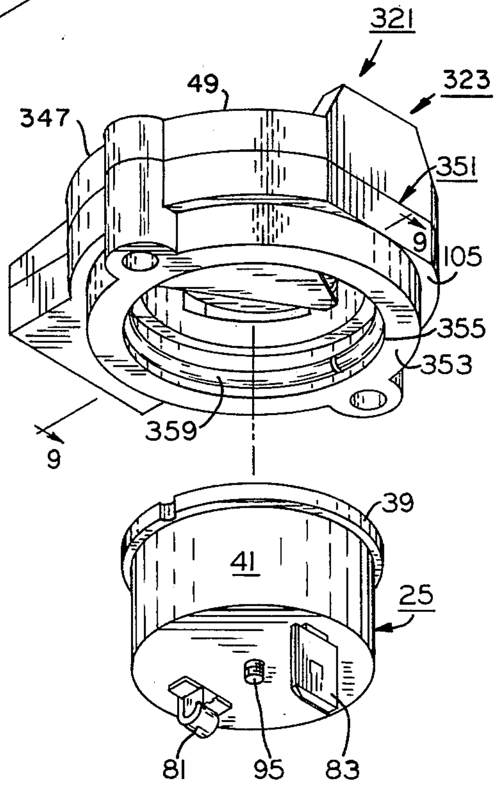
Figure 9:
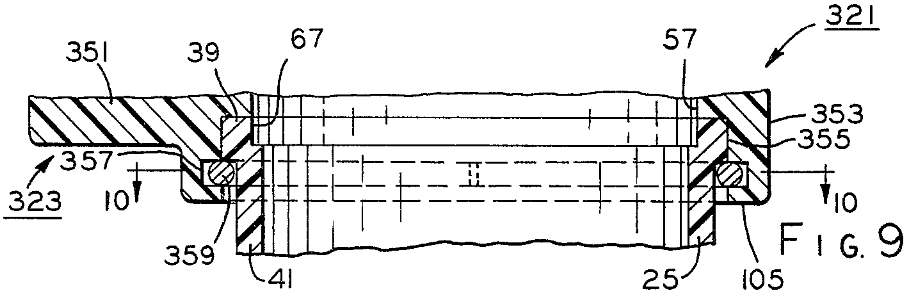
FIGS. 9 and 10 are sectional views taken along lines 9—9 and 10—10 of FIGS. 8 and 9, respectively.
Figure 10:
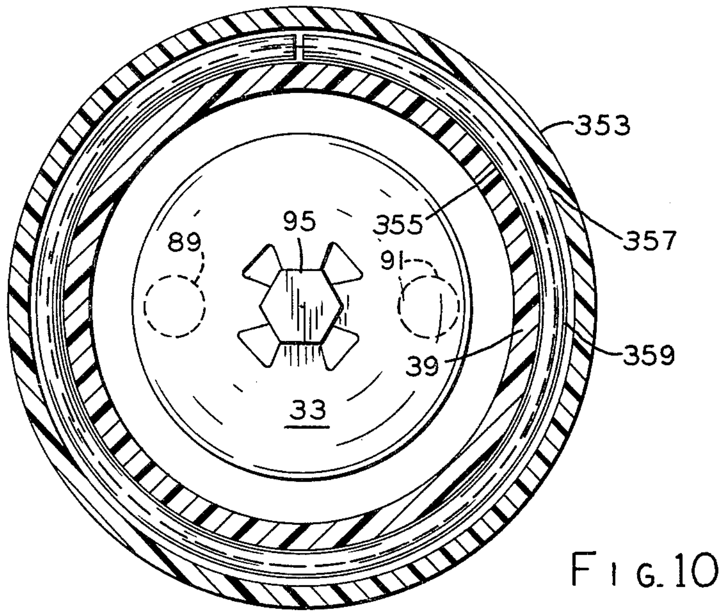

With reference to FIGS. 8–10, still another or an alternative releasable combination 321 is shown in one form of the invention having generally the same component parts and functioning in circuit 141 generally in the same manner as the previously described releasable combination 21 with the exceptions noted hereinafter. While releasable combination 321 is believed to meet at least some of the objects and advantageous features set out hereinbefore, it is believed that releasable combination 321 may have indigenous objects and advantageous features as may be in part apparent and in part pointed out hereinafter.

In releasable combination 321, a starter device 323 is provided with a housing 347 comprising upper housing member 49 and a lower housing member 351; and, the material, such as a resin or the like, from which the lower housing member is formed does not necessarily have to have resilient or yieldable characteristics. Means, such as a generally annular uninterrupted or continuous flange or flange means 353 for instance defining a passage or opening 355 therein, for receiving or otherwise accommodating the passage of casing flange 39 thereinto is integrally formed on lower end wall 105 of housing member 351 so as to depend therefrom generally about opening 57 which extends through lower end wall 105. A generally annular groove or groove means 357 is provided within housing flange 353 so as to extend generally circumferentially about passage 355 therein and generally in coaxially spaced relation with opening 57, and resilient or yieldable means, such as a generally annular split-ring retainer or spring 359 for instance, is disposed or otherwise arranged in groove 357 of housing flange 353 for releasable engagement with casing flange 39 of protector 25 when starter device 323 and the protector are assembled into the releasable combination 321 thereof, as discussed hereinafter.

In a method of assembling starter device 323 and protector device 25 in the releasable combination 321 thereof in one form of the invention, the protector device is moved or otherwise disposed into a position in which casing flange 39 thereof is generally aligned or otherwise registered within passage 355 in housing flange 353 with the casing flange arranged in abutment or interfering engagement with split-ring spring 359. Thereafter, an assembly force is applied or otherwise exerted on at least one of starter device 323 and protector device 25, and since casing flange 39 is in interfering engagement with split-ring spring 359, the applied or assembly force causes the split-ring spring to be stressed or to otherwise yield from the at-rest position thereof in groove 357 toward a stressed or displaced position therein. Upon such stressing or yielding of split-ring spring 359, the opposed free or split ends thereof open or are spread apart so as to accommodate the passage or movement of casing flange 39 through or past the split-ring spring toward a preselected assembly position thereof at least closely adjacent lower end wall 105 of housing member 351. Of course, upon the passage of casing flange 39 through split-ring spring 359, the split-ring spring resiles or otherwise relaxes from its displaced position toward the at-rest position thereof in groove 357 of housing flange 353. Upon resiling to the at-rest position thereof, split-ring spring 359 is disposed or otherwise arranged in releasable engagement about or with a lower circumferential end or part of casing flange 39, i.e., in displacement preventing engagement therewith, so as to releasably retain or otherwise maintain starter device 323 and protector device 25 against separation from the preselected assembly position or the releasable combination 321 thereof. It may be noted that with starter device 323 and protector device 25 in the releasable combination 321 thereof, yieldable means or split-ring spring 359 is associated with the starter device and disposed so as to extend generally circumferentially with respect to at least a major portion of casing flange 39 and/or casing sidewall 77 of protector device for releasable engagement therewith so as to releasably maintain the starter device and the protector device against separation from the releasable combination thereof. Further, when starter device 323 and protector device 25 are so assembled into the releasable combination 321 thereof, PTCR 31 and bimetal switch element 33 are communicated in thermal coupling relation through openings 57, 67 in housing member 351 and casing 41, respectively. Of course, separation of starter device 323 and protector device 25 from the releasable combination 321 thereof may be effected by applying a disassembly force thereon causing casing flange 39 to displace split-ring spring 359 generally in the same manner as discussed hereinabove thereby to accommodate the return or displacement passage of the casing flange through the split-ring spring.

Figure 11:
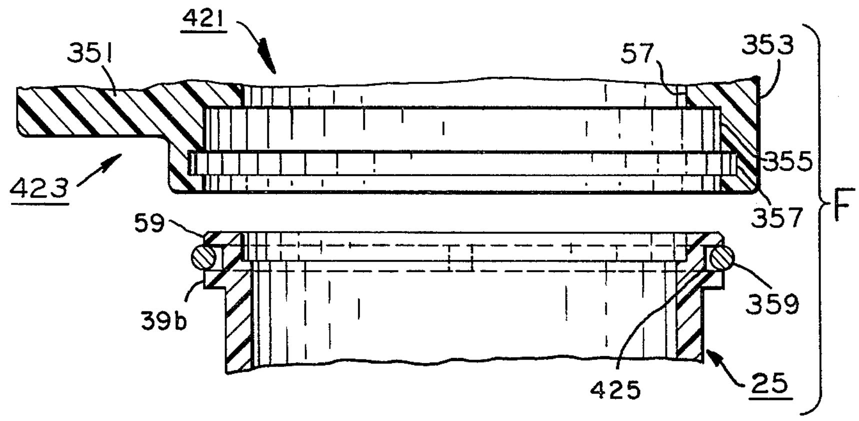
FIGS. 11 and 12 are generally the same as FIG. 9 but with FIG. 11 showing the protector device in exploded relation with respect to the starter device to illustrate the yieldable means carried in a groove provided therefor about the protector device.
Figure 12:
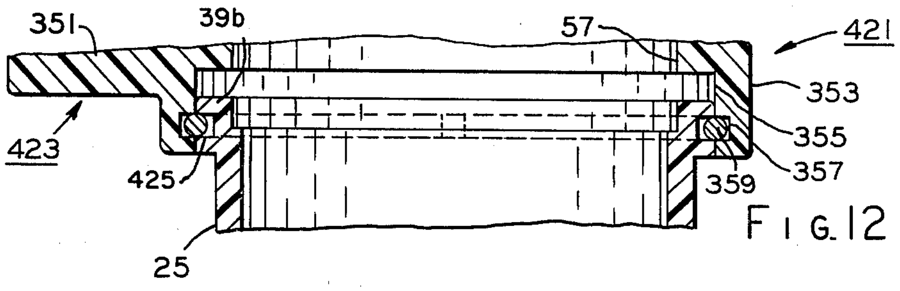

In FIG. 11, another or an alternative releasable combination 421 is shown in one form of the invention having generally the same component parts and functioning in circuit 141 generally in the same manner as the above-discussed releasable combination 321 with the exceptions noted below. While releasable combination 421 is believed to meet at least some of the objects set out hereinbefore, it is also believed that releasable combination 421 may have indigenous objects and advantageous features as may be in part apparent and in part pointed out hereinafter.

In releasable combination 421, lower housing 351 of starter device 423 is the same as that utilized in the above-discussed starter device 323 with the exception that split-ring spring 359 is omitted from groove 357 of housing flange 353. Instead, split-ring spring 359 is carried in a groove or groove means 425 disposed generally circumferentially of a casing flange 39b of protector 25 and extending into marginal edge 59 of the casing flange. Of course, the assembly of starter device 423 and protector device 25 is much the same as previously discussed with respect to starter device 323 and protector 25 except that split-ring spring 359 is resiliently displaced in groove 425 of casing flange 39b when the split-ring spring is urged into interfering engagement with the lower end of housing flange 353 in response to an assembly force applied onto starter device 423 and protector device 25. Thereafter upon further assembly force movement of casing flange 39b into opening 355 of housing flange 353 toward a preselected assembly position, split-ring spring 359 resiles toward its at-rest position into releasable engagement with housing groove 357 when groove 425 of the casing flange becomes generally aligned with housing groove 357. With split-ring spring 359 so releasably engaged between grooves 357, 425 in housing flange 353 and casing flange 39*b*, starter device 423 and protector device 25 are releasably retained or otherwise maintained in the preselected assembly position against separation from the releasable combination 421 thereof. Thus, with starter device 423 and protector device 25 in the releasable combination 421 thereof, it may be noted that split-ring spring 359 associated with casing flange 39*b* of protector 25 is disposed so as to extend generally circumferentially with respect to at least a major portion of housing flange 353 of starter device 423 for releasable engagement therewith so as to releasably maintain the starter device and the protector device against separation from the releasable combination thereof.

Figure 13:
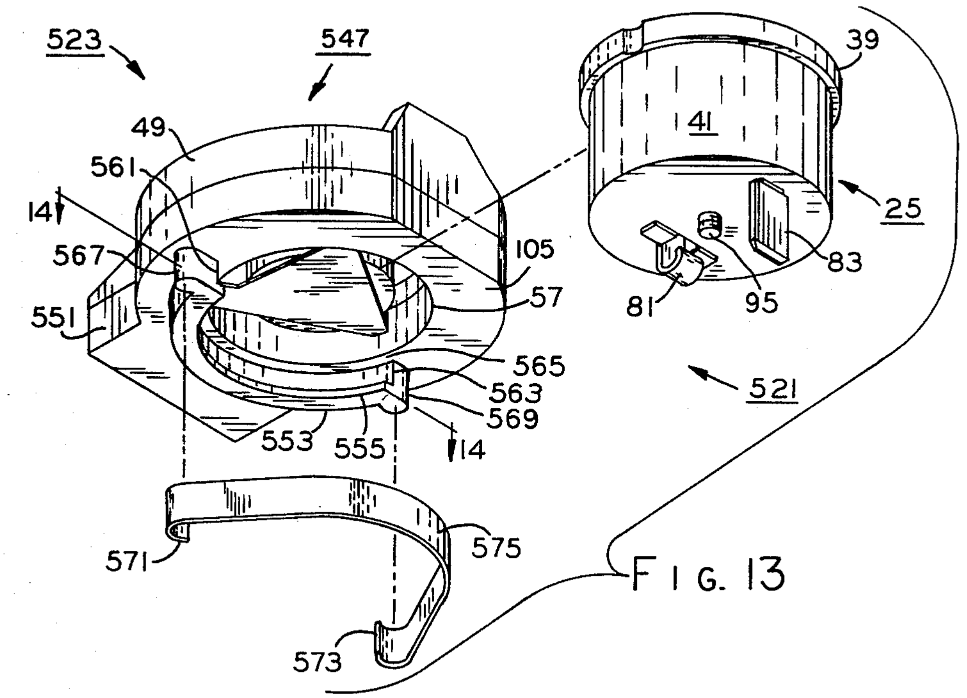
Figure 14:
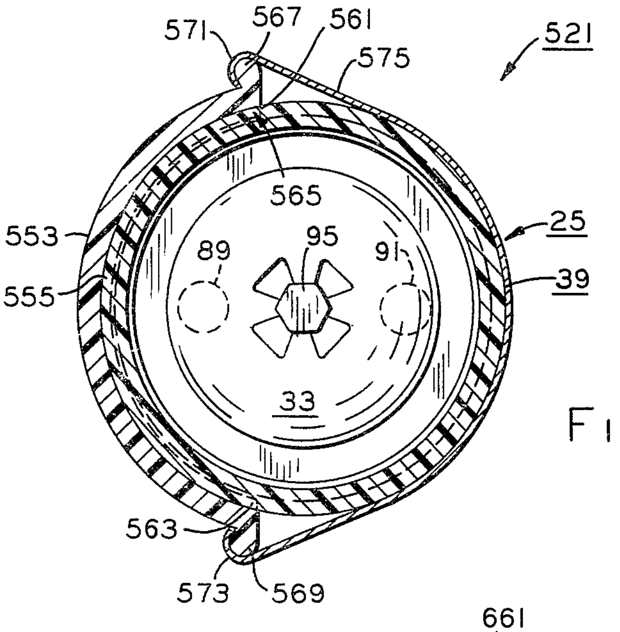
FIG. 14 is a sectional view taken along line 14—14 of FIG. 13.

Referring now to FIGS. 13 and 14, another or an alternative releasable combination 521 of a separable starter device 523 and separable protector device 25 is illustrated in one form of the invention having generally the same component parts and functioning in circuit 141 generally in the same manner as the previously described releasable combination 21 with the exceptions noted hereinafter. While releasable combination 521 is believed to meet at least some of the objects set out hereinbefore, it is also believed that releasable assembly 521 may have indigenous objects and advantageous features as may be in part apparent and in part pointed out hereinafter.

In releasable combination 521, starter device 523 is provided with a housing 547 comprising upper housing member 49 and a lower housing member 551 which may be formed of any suitable material, such as a resin or the like for instance, as previously mentioned. Lower housing member 551 is generally the same as the previously described housing member 51 except that means, such a generally arcuate shaped flange or flange means 553, for receiving or otherwise supporting casing flange 39 of protector device 25 is integrally formed with lower end wall 105 of lower housing member 551 so as to depend therefrom generally in coaxially spaced relation with opening 57 through the lower end wall. It may be noted that housing flange 553 extends generally arcuately or circumferentially with respect to opening 57 only generally about one-half of the circumference thereof, and means, such as an arcuate groove or groove means 555 for instance, is provided in the housing flange for seating or otherwise engaging casing flange 39. A pair of opposed adjacent free end portions 561, 563 are provided on housing flange 553 and define therebetween means, such as a passage 565 for instance, for the passage therethrough of casing flange 39 into seating engagement with flange 555 of the housing flange. A pair of means, such as extensions 567, 569 or the like for instance, are integrally formed on housing flange 553 at least generally adjacent free end portions 561, 563 thereof for receiving or otherwise retaining a pair of means for releasable interconnection therewith, such as generally opposed fingers 571, 573, for instance, integral with a yieldable or resilient means, such as a strap-spring 575 or the like.

In a method of assembling starter device 523 and protector device 25 into the releasable combination 521 thereof in one form of the invention, the protector device is moved or otherwise disposed into a preselected assembly position with casing flange 39 received in part within housing flange 553 in seating engagement with groove 555 thereof. With casing flange 39 so arranged in the preselected assembly position, strap-spring 575 is located in abutting engagement with marginal edge 59 of the casing flange, and opposite spring fingers 571, 573 of the strap-spring are snapped over or otherwise resiliently urged into releasable engagement with extensions 567, 569 of housing flange 553. Thus, it may be noted that protector 25 is releasably received, retained or otherwise maintained in the releasable combination 521 against separation by the seating engagement of casing flange 39 with groove 555 of housing flange 553 and also by the displacement preventing engagement of strap-spring 575 with marginal edge 59 of the casing flange when opposite end fingers 571, 573 are grippingly or otherwise releasably engaged with extensions 567, 569 on the housing flange. It may also be noted that scrap-spring or yieldable means 575, when so associated with starter device 523, is disposed so as to extend generally circumferentially with respect to at least a major portion of casing flange 39, i.e. about the circumference thereof as defined by marginal edge 59 of the casing flange, thereby to releasably maintain the starter device and protector device 25 against separation from the releasable combination 521 thereof.

Figure 15:
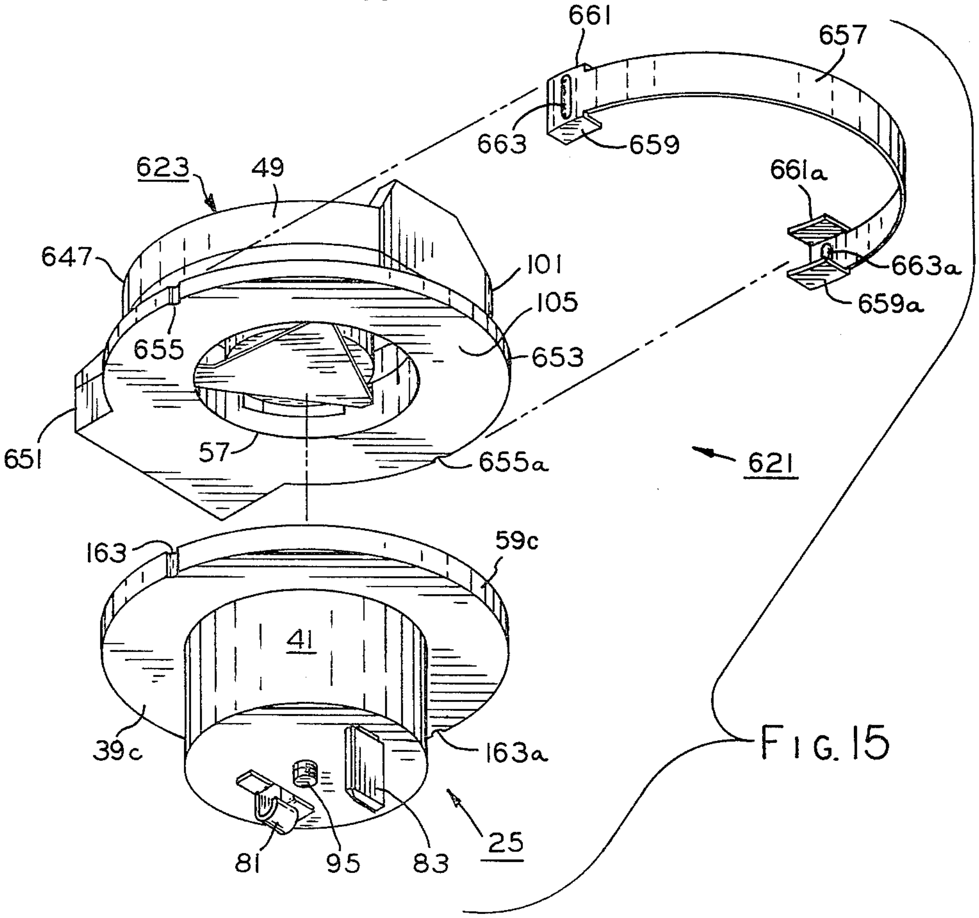
Figure 16:
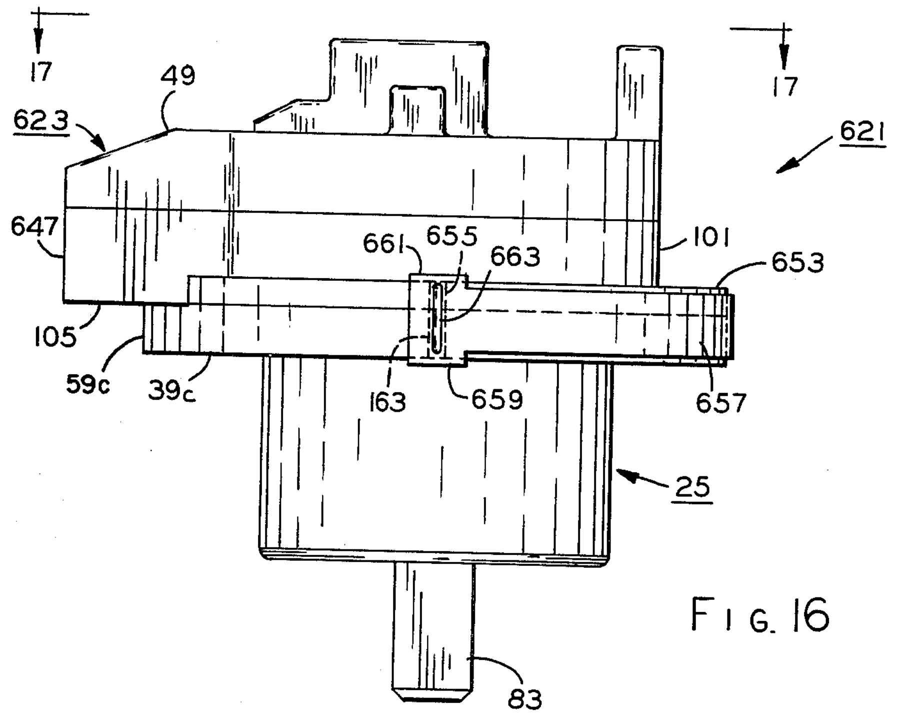
FIGS. 16 and 17 are right side and top elevational views of the releasable combination illustrated in FIG. 15, respectively.
Figure 17:
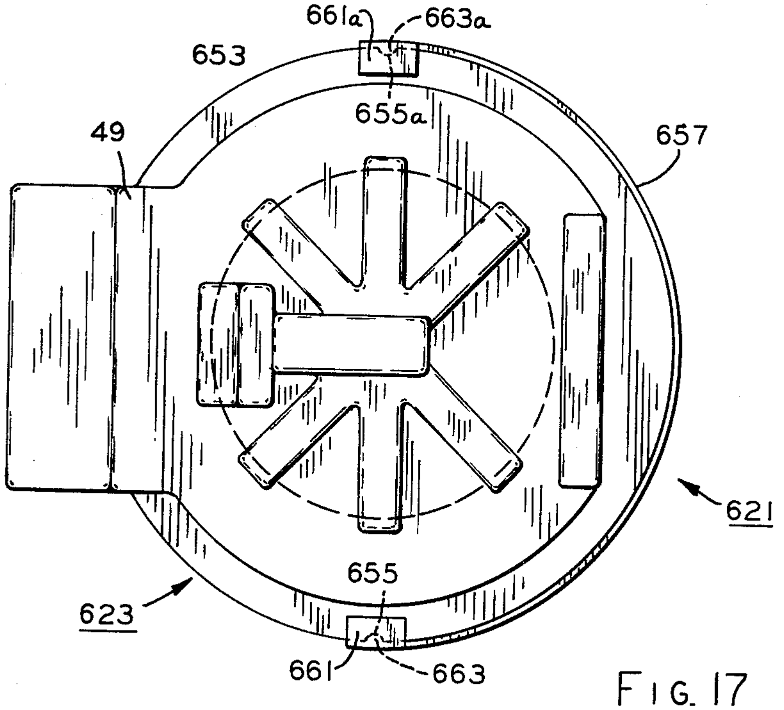

With respect to FIGS. 15–17, another releasable combination 621 of a separable starter device 623 and separable protector device 25 is illustrated in one form of the invention having generally the same component parts and functioning in circuit 141 generally in the same manner as the previously described releasable combination 21 with the exceptions noted hereinafter. While it is believed that releasable combination 621 meets at least some of the objects set out hereinbefore, it is also believed that releasable combination 621 may have indigenous objects and advantageous features as may be in part apparent and in part pointed out hereinafter.

In releasable combination 621, starter device 623 is provided with a housing 647 comprising upper housing member 49 and a lower housing member 651 which may be formed from any suitable material, such as a resin or the like for instance. Lower housing member 651 is generally the same as the previously described housing member 51 except that lower end wall 105 of lower housing member 651 is generally planar, and a generally radially extending flange or flange means 653 is integrally formed with sidewall 101 of lower housing member 651 so as to extend at least in part generally thereabout at least generally adjacent the lower end wall. A pair of opposite generally diametrically spaced apart notches 655, 655*a* are provided in radial housing flange 653 for association with a yieldable or resilient means, such as strap-spring 657, as discussed in detail hereinafter.

Casing 41 of protector device 25 is provided with a flange 39*c* having a marginal edge 59*c* thereon defining the circumference thereof which is generally the same as that of housing flange 653, and notches 161, 161*a* are provided in the marginal edge. In a preselected assembly position of starter device 623 and protector 25, casing flange 39*c* of the protector device is abutted against lower end wall 105 of the starter device so that notches 161, 161*a* in the casing flange are generally aligned with notches 655, 655*a* in housing flange 653.

Yieldable or resilient means, such as strap-spring 657, is provided for releasably retaining or otherwise maintaining starter device 623 and protector device 25 against separation from the releasable combination 621 thereof, i.e. the preselected assembly position thereof.

Strap-spring 657 extends generally circumferentially about respective parts of housing flange 653 and casing flange 39*c*, and a pair of sets of means, such as opposed gripping fingers 659, 661 and 659*a*, 661*a* or the like for instance, are integrally formed on opposite end portions of the strap-spring so as to extend therefrom into gripping or releasable engagement with the housing flange and the casing flange. Thus, the gripping engagement of strap-spring fingers 659, 661 and 659*a*, 661*a* with abutted housing flange 653 and casing flange 39*c* therebetween retains starter device 623 and protector device 25 generally against vertical displacement from the releasable combination thereof. Strap-spring 657 is also provided with a pair of opposed detents 663, 663*a* between fingers 659, 661 and 659*a*, 661*a*, and the resiliency of the strap-spring urges the detents into interlocking or releasable engagement with the aligned notches 161, 161*a* 655, 655*a* of casing flange 39*c* and housing flange 653, respectively, thereby to releasably retain or otherwise maintain starter device 623 and protector device against separation or generally horizontal displacement.

In a method of assembling the releasable combination in one form of the invention, casing flange 39*c* of protector device 25 is moved or otherwise disposed into the preselected assembly position abutting with lower end wall 105 of starter device 623, and notches 163, 163*a* in the casing flange are aligned with notches 655, 655*a* in housing flange 653. Thereafter, fingers 659, 661 and 659*a*, 661 of strap-spring 657 may be resiliently engaged or otherwise releasably registered with housing flange 653 and casing flange 39*c* therebetween, and an assembly force applied onto the strap-spring to move it into its preselected assembly position snapping or resiliently urging its detents 663, 663*a* into releasable engagement with aligned notches 163, 163*a* and 655, 655*a*, respectively. Thus, it may be noted that starter device 623 and protector device 25 is retained or maintained in the releasable combination 621 thereof against separation by the releasable engagement of fingers 659, 661 and 659*a*, 661*a* on strap-spring 657 with housing flange 653 and casing flange 39*c* and also by the releasable engagement of detents 663, 663*a* on the strap-spring with aligned notches 655, 655*a* and 163, 163*a* in the housing flange and the casing flange, respectively. It may also be noted that strap spring 657, when so associated with starter device 623, is disposed so as to extend circumferentially with respect to at least a major portion of casing flange 39*c*, i.e. generally abut the circumference thereof defined by marginal edge 59*c* of the casing flange, thereby to releasably maintain the starter device and protector device 25 against separation from the releasable combination 621 thereof. Further, it may also be noted that PTCR 31 and bimetal switch element 33 are communicated in thermal coupling relation through openings 57, 67 in starter device 623 and protector 25 when they are in the releasable combination 621 thereof.

From the foregoing, it is now apparent that novel releasable combinations 21, 221, 321, 421, 521, 621 and novel methods of assembling such have been presented meeting the objects and advantageous features set out above, as well as others, and it is contemplated that changes as to the precise arrangements, shapes, details and connections of the constructions illustrated herein by way of example for purposes of disclosure, as well as the precise steps and order thereof of the methods, may be made by those having ordinary skill in the art without departing from the spirit of the invention or the scope thereof as defined by the claims which follow.

What we claim as new and desire to secure by Letters Patent of the United States is:

1. A releasable combination of a separable starter device and a separable protector device for connection in circuit relation with a winding circuit of a dynamoelectric machine, the releasable combination comprising:

casing means for said separable protector device and including a first sidewall disposed between a pair of generally opposite first end walls, one of said first end walls comprising a first flange extending generally circumferentially about said first sidewall generally radially thereof, a first chamber within said first sidewall between said first end walls, and a first opening through said one first end wall intersecting with said first chamber;

thermally and current responsive switch means mounted to the other of said first end walls within said first chamber for the connection in the circuit relation with the winding circuit of the dynamoelectric machine when said starter device and said protector device are in the releasable combination thereof;

housing means for said separable starter device comprising a second sidewall disposed between a pair of generally opposite second end walls, a second chamber within said second sidewall between said second end walls, a second opening through one of said second end walls intersecting with said second chamber and arranged to communicate with said first opening in said casing means when said starter device and said protector device are in the releasable combination thereof, a pair of apertures extending through said second sidewall and intersecting with said chamber, means for defining a yieldable section of said housing means including a slot through said one second end wall and at least or part of said second sidewall and intersecting with said second chamber and said second opening, a second flange extending from said one second end wall exteriorly of said housing generally coaxially with said second opening and sized to extend in seating engagement generally circumferentially about at least a major portion of said first flange on said casing means, a pair of opposed adjacent free ends on said second flange and spaced apart on opposite sides of said slot, and means between said free ends of said second flange for the passage therethrough of said first flange on said casing means, said yieldable section of said housing being initially yieldable to effect the spreading apart of said free ends on said second flange in response to an assembly force applied on at least one of said housing means and said casing means urging said first flange into interfering engagement with said free ends on said second flange and the subsequent passage through said passage means of said first flange on said casing means into the seating engagement with said second flange, and said yieldable section thereafter resiling to reposition said free ends on said second flange in releasable displacement preventing engagement with said first flange on said casing means thereby to releasably maintain said protector device and starter device against separation from the releasable combination thereof;

a PTCR disposed in said second chamber in thermal coupling relation through said first and second openings with said switch means when said starter device and said protector device are in the releasable combination thereof, and a pair of opposite contact sides on said PTCR;

a pair of contact plates arranged in said second chamber in electrical contacting engagment with said opposite contact sides of said PTCR and disposed at least adjacent said second end walls, respectively; and a pair of female terminal means arranged at least in part in said apertures and connected with said contact plates, respectively, for the connection in the circuit relation with the winding circuit of the dynamoelectric machine when the starter device and the protector device are in the releasable combination thereof.

2. A releasable combination of a separable starter device and a separable protector device for connection in circuit relation with a winding circuit of a dynamoelectric machine, the releasable combination comprising housing means for said starter device, a PTCR in said housing means, switch means in said protector device for association in thermal coupling relation with said PTCR when said starter device and said protector device are in the releasable combination thereof, and said housing means having at least a yieldable section including at least flange means integrally formed with said housing means for receiving in releasable engagement at least an integral part of said protector device and with said at least flange means extending generally circumferentially about at least a major portion of said at least integral part of said protector device when said starter device and said protector device are in the releasable combination thereof so as to releasably maintain said starter device and said protector device against separation from the releasable combination thereof.

3. A releasable combination as set forth in claim 2 wherein said at least flange means includes means for the passage thereinto of said at least integral part of said protector device.

4. A releasable combination as set forth in claim 4 wherein said at least flange means further includes a pair of means at least adjacent said passage means and urged toward said at least integral part of said protector device for abutment therewith so as to releasably maintain said protector device against separation through said passage means from said at least flange means when the starter device and the protector device are in the releasable combination thereof.

5. A releasable combination of a separable starter device and a separable protector device for connection in circuit relation with a winding circuit of a dynamoelectric machine, the releasable combination comprising a PTCR in said starter device, switch means in said protector device for association in thermal coupling relation with said PTCR when said starter device and said protector device are in the releasable combination thereof, and split-ring spring means carried on one of said starter device and said protector device and disposed so as to extend generally circumferentially with respect to at least a major portion of a part of the other of said starter device and said protector device for releasable engagement therewith when said starter device and said protector device are in the releasable combination thereof so as to releasably maintain said starter device and said protector device against separation from the releasable combination thereof.

6. A releasable combination as set forth in claim 5 wherein said one of said starter device and said protector device includes groove means for seating said split-ring spring means.

7. A releasable combination as set forth in claim 5 wherein said part of said other of said starter device and said protector device includes groove means for receiving in the releasable engagement a part of said split-ring spring means.

8. A releasable combination as set forth in claim 5 wherein said one of said starter device and said protector device includes groove means for carrying therein said split-ring spring means, and said part of said other of said starter device and said protector device including another groove means disposed at least in part in alignment with said first named groove means for receiving in the releasable engagement a part of said split-ring spring means.

9. A releasable combination of a separable starter device and a separable protector device for connection in circuit relation with a winding circuit of a dynamoelectric machine, the releasable combination comprising a PTCR in said starter device, switch means in said protector device for association in thermal coupling relation with said PTCR when said starter device and said protector device are in the releasable combination thereof, and strap spring means associated with one of said starter device and said protector device and disposed so as to extend generally circumferentially with respect to a major portion of a part of the other of said starter device and said protector device for releasable engagement therewith when said starter device and said protector device are in the releasable combination thereof so as to releasably maintain said starter device and said protector device against separation from the releasable combination thereof, said strap spring means including a pair of opposite ends engaged with said one of said starter device and said protector device.

10. A releasable combination as set forth in claim 9 further comprising flange means on said one of said starter device and said protector device for seating engagement with said part of said other of said starter device and said protector device, said opposite ends of said strap spring means being engaged with said flange means.

11. A releasable combination of a separable starter device and a separable protector device for connection in circuit relation with a winding circuit of a dynamoelectric machine, the releasable combination comprising a PTCR in said starter device, switch means in said protector device for association in thermal coupling relation with said PTCR when said starter device and said protector device are in the releasable combination thereof, said starter device and said protector device respectively including a pair of detent means for alignment with each other, and strap spring means for association with said starter device and said protector device and disposed so as to extend generally circumferentially with respect to a major portion of a part of at least one of said starter device and said protector device when said starter device and said protector device are in the releasable combination thereof so as to releasably maintain said starter device and said protector device against separation from the releasable combination thereof, said strap spring means including a pair of means biased toward said aligned detent means for abutment therewith, and a pair of sets of opposed spaced apart tab means for displacement preventing engagement with said starter device and said protector device, respectively.

12. A releasable combination of a separable starter device and a separable protector device for connection in circuit relation with a winding circuit of a dynamoelectric machine, the releasable combination comprising:

casing means for said protector device including a bimetal switch element therein, and flange means integrally formed with said casing means for association with said starter device when said starter device and said protector device are in the releasable combination thereof; and housing means for said starter device including a PTCR therein arranged so as to be coupled in thermal relation with said bimetal switch element when said starter device and protector device are in the releasable combination thereof, and another flange means integrally formed with said housing means and extending generally circumferentially with respect to at least a major portion of said first named flange means on said casing means for releasable engagement therewith so as to seat said casing means in releasable displacement preventing engagement with said housing means against separation therefrom when said starter device and said protector device are in the releasable combination thereof.

13. A releasable combination as set forth in claim 12 wherein said casing means and said housing means respectively include means for communicating said PTCR and said bimetal switch element in the thermal coupling relation when said starter device and said protector device are in the releasable combination thereof.

14. A releasable combination as set forth in claim 12 wherein said another flange means includes means for seating said first named flange means in the releasable displacement preventing engagement.

15. A releasable combination as set forth in claim 14 wherein said another flange means further includes an expansible passage means for the passage therethrough of said first named flange means into said seating means of said another flange means.

16. A releasable combination as set forth in claim 15 wherein said another flange means further includes a pair of adjacent opposed free end portions generally defining said passage means, said passage means being expansible in response to an assembly force applied on at least one of said housing means and said casing means urging said first named flange means into interfering engagement with said free end portions upon the passage through said passage means of said first named flange means into said seating means so as to be disposed in the releasable displacement preventing engagement with said another flange means.

17. A releasable combination of a separable starter device and a separable protector device for connection in circuit relation with a winding circuit of a dynamoelectric machine, the releasable combination comprising:

casing means for said protector device including a bimetal switch element therein, and flange means for association with said starter device;

housing means for said starter device including a PTCR therein arranged so as to be coupled in thermal relation with said bimetal switch element when said starter device and said protector device are in the releasable combination thereof, at least a yieldable flange means on said housing for receiving in releasable engagement said first named flange means and extending generally about at least a major portion thereof when said starter device and said protector device are in the releasable combination, means on said at least yieldable flange means for seating said first named flange means, means in said at least yieldable flange means for the passage of said first named flange means into said seating means, and a pair of opposed free end portions on said at least yieldable flange means generally defining at least a part of said passage means, said at least yieldable flange means being yieldable to effect spreading of said opposed free end portions in response to an assembly force applied onto at least one of said starter device and said protector device urging said first named flange means into interfering engagement with said opposed free end portions upon the passage through said passage means of said first named flange means toward said seating means into the displacement preventing engagement with said at least resilient means.

18. A releasable combination as set forth in claim 16 wherein said another flange means further includes a pair of means at least adjacent said passage means and adapted for abutment with said first named flange means so as to releasably retain it against return passage through said passage means, said another flange means resiling upon the passage of said first named flange means through said passage means into said seating means so as to urge said abutment means toward releasable engagement with said another flange means.

19. A releasable combination of a separable starter device and a separable protector device for connection in circuit relation with a winding circuit of a dynamoelectric machine, the releasable combination comprising:

casing means for said protector device and including a bimetal switch element therein;

housing means for said starter device including a PTCR therein, said PTCR being coupled in thermal relation with said bimetal switch element when said starter device and said protector device are in the releasable combination thereof;

a split-ring spring;

means extending generally circumferentially about at least a major portion of a part of one of said casing means and said housing means for seating said split-ring spring therein; and means extending generally circumferentially about at least a major portion of a part of the other of said casing means and said housing means for releasable engagement with said split-ring spring so as to releasably maintain said starter device and said protector device against separation when they are in the releasable combination thereof.

20. A releasable combination of a separable starter device and a separable protector device for connection in circuit relation with a winding circuit of a dynamoelectric machine, the releasable combination comprising:

casing means for said protector device and including a bimetal switch element therein;

housing means for said starter device including a PTCR therein, said PTCR being coupled in thermal relation with said bimetal switch element when said starter device and said protector device are in the releasable combination thereof;

resilient means havng at least in part a generally annular configuration;

groove means extending generally circumferentially about at least a major portion of a part of one of said casing means and said housing means for seating said resilient means therein; and another groove means extending generally circumferentially about at least a major portion of a part of the other of said casing means and said housing means for releasable engagement with at least a part of said resilient means seated in said first named groove means so as to releasably maintain said starter device and said protector device against separation when they are in the releasable combination thereof.

21. A releasable combination of a separable starter device and a separable protector device for connection in circuit relation with a winding circuit of a dynamoelectric machine, the releasable combination comprising:

casing means for said protector device and including a bimetal switch element therein;

housing means for said starter device including a PTCR therein, said PTCR being coupled in thermal relation with said bimetal switch element when said starter device and said protector device are in the releasable combination thereof;

resilient means having at least in part a generally annular configuration;

means extending generally circumferentially about at least a major portion of a part of one of said casing means and said housing means for seating said resilient means therein;

means extending generally circumferentially about at least a major portion of a part of the other of said casing means and said housing means for releasable engagement with said resilient means so as to releasably maintain said starter device and said protector device against separation when they are in the releasable combination thereof; and a pair of openings in said casing means and said housing means, respectively, arranged to effect the thermal coupling relation of said PTCR and said bimetal switch element when said starter device and said protector device are in the releasable combination thereof, one of said openings comprising said part of said one of said casing means and said housing means, and said seating means being in said one opening.

22. A releasable combination of a separable starter device and a separable protector device for connection in circuit relation with a winding circuit of a dynamoelectric machine, the releasable combination comprising:

casing means for said protector device and including a bimetal switch element therein, and a flange extending generally circumferentially at least in part about said casing means;

housing means for said starter device and including a PTCR therein, and means exteriorly of said housing means for seating said flange on said casing means in a preselected position with respect to said housing means, said PTCR being coupled in thermal relation with said bimetal switch element when said starter device and said protector device are in the releasable combination thereof; and spring means including a pair of opposite ends engaged with said housing means and extending generally circumferentially about at least a major portion of said flange for releasable engagement therewith when said flange is in its preselected position to releasably maintain said starter device and said protector device against separation when they are in the releasable combination thereof.

23. A releasable combination of a separable starter device and a separable protector device for connection in circuit relation with a winding circuit of a dynamoelectric machine, the releasable combination comprising:

casing means for said protector device and including a bimetal switch element therein, and a flange extending generally circumferentially at least in part about said casing means;

housing means for said starter device and including a PTCR therein, means exteriorly of said housing means for seating said flange on said casing means in a preselected position with respect to said housing means, and a pair of spaced apart tabs on said seating means, said PTCR being coupled in thermal relation with said bimetal switch element when said starter device and said protector device are in the releasable combination thereof; and resilient means extending generally circumferentially about at least a major portion of said flange for releasable engagement therewith when said flange is in its preselected position to releasably maintain said starter device and said protector device against separation when they are in the releasable combination thereof, and said resilient means including a pair of opposite ends engaged with said tabs, respectively.

24. A releasable combination of a separable starter device and a separable protector device for connection in circuit relation with a winding circuit of a dynamoelectric machine, the releasable combination comprising:

casing means for said protector device and including a bimetal switch element therein, and a flange extending generally circumferentially at least in part about said casing means;

housing means for said starter and device including a PTCR therein, said PTCR being coupled in thermal relation with said bimetal switch element when said starter device and said protector device are in the releasable combination thereof, and another flange means extending generally circumferentially at least in part about said housing means for seating engagement in a preselected position with respect to said flange on said casing means; and resilient means extending generally circumferentially about at least a major portion of said flange and flange means and including a pair of sets of opposed end tab means for releasable engagement with said flange and said flange means when said flange means is in its preselected position to releasably maintain said starter device and said protector device against separation when they are in the releasable combination thereof.

25. A releasable combination as set forth in claim 24 wherein said flange and flange means respectively include a pair of opposite detent means for alignment when said flange means is in the preselected position thereof, and said resilient means including a pair of means received in said detent means for abutment therewith, respectively.

26. A releasable combination as set forth in claim 24 wherein said resilient means comprises a strap-spring having a pair of opposite end portions, said sets of end tab means being integral with said opposite end portions, respectively.

27. A releasable combination of a separable starter device and a separable protector device for connection in circuit relation with a winding circuit of a dynamoelectric machine, a PTCR in the switch device, and switch means in the protector device adapted for thermal coupling relation with the PTCR when the starter device and protector device are in the releasable combination thereof, a method of assembling the releasable combination comprising the steps of:

positioning a yieldable means associated with one of the starter device and the protector device so as to extend generally circumferentially with respect to at least a major portion of a part of the other of the starter device and the protector device for releasable engagement therewith so as to arrange the starter device and the protector device in their releasable combination with the switch means and the PTCR in the thermal coupling relation and releasably maintaining thereby the starter device and the protector device in their releasable combination against separation.

28. The method as set forth in claim 27 wherein the positioning and releasably maintaining step includes yielding the yieldable means upon the arrangement of the protector device and the starter device in the releasable combination thereof and resiling the yieldable means so that at least a part thereof is disposed in the releasable engagement with the other of the starter device and the protector device.

29. The method as set forth in claim 27 wherein the positioning and releasably maintaining step comprises urging the part of the other of the starter device and protector device into interfering engagement with the yieldable means to effect displacement movement thereof and then inserting the part of the other of the starter device and the protector device into a preselected position in the releasable engagement thereof with the yieldable means.

30. The method as set forth in claim 29 wherein the urging and inserting step includes passing the part of the other of the starter device and the protector device through a means for the passage thereof in the yieldable means upon the displacement movement of the yieldable means.

31. A releasable assembly of a separable starter device and a separable protector device, the protector device having a casing with a bimetal switch element therein, an opening in the casing communicating with the bimetal switch element, and a flange extending generally circumferentially about the casing, and the starter device having a housing with a PTCR therein, another opening in the housing communicating with the PTCR, a yieldable housing section including a means extending at least in part generally about the another opening exteriorly of the housing for seating the casing flange in releasable engagement therewith, a method of assembling the releasable combination comprising the steps of:

associating the casing flange in interfering engagement with a pair of abutments on the seating means;

applying a force onto at least one of the casing and the housing with the casing flange and abutment pair in the interfering engagement thereof;

yielding the yieldable housing section in response to the applied force acting through the interfering engagement of the casing flange and the abutment pair and spreading apart the abutment pair;

passing the casing flange through a means for the passage thereof defined in the seating means generally between the abutment means when the abutment means are spread apart;

seating the casing flange generally in a preselected position within the seating means and communicating the first named opening with the another opening so as to place the bimetal switch element and the PTCR in thermal coupling relation therethrough; and resiling the yieldable housing section and returning the abutment pair to positions releasably capturing the casing flange in its preselected position within the seating means.

32. A releasable combination of a separable starter device and a separable protector device, the protector device having a casing with a bimetal switch element therein, an opening through the casing communicating with the bimetal switch element, and a groove extending at least in part generally about the casing, the switch device having a housing with a PTCR therein, another opening through the housing communicating with the PTCR, and another groove in the housing extending at least in part generally about the another opening, a method of assembling the releasable combination comprising the steps of:

arranging a spring in one of the first named and another grooves so as to extend at least in part generally about one of the another opening and the casing;

aligning the casing with the another opening in the housing;

applying a force on at least one of the casing and the housing to move them toward a preselected assembly position and inserting at least the first named groove of the casing into the another opening in the housing; and snapping the spring into releasable engagement with the other of the first named and another grooves in response to the applied force acting on the at least one of the casing and the housing so as to releasably maintain the casing and the housing against separation from the preselected assembly position thereof and communicating the first named opening and the another opening to place the bimetal switch element and the PTCR in thermal coupling relation therethrough when the starter device and the protector device are releasably maintained in the preselected assembly position thereof.

33. A releasable combination of a separable starter device and a separable protector device, the protector device having a casing with a bimetal switch element therein, an opening through the casing communicating with the bimetal switch element, and a flange on the casing extending at least in part generally circumferentially thereabout, and the starter device having a housing with a PTCR therein, another opening through the housing communicating with the PTCR, and another flange on the housing extending at least in part generally circumferentially with respect to the another opening, a method of assembling the releasable combination comprising the steps of:

moving the casing and housing into a preselected assembly position and engaging at least in part the first named and another flanges with each other;

communicating the bimetal switch element and the PTCR through the first named and another openings upon the movement of the casing and the housing into the preselected assembly position thereof; and positioning a spring so as to extend generally circumferentially about a major portion of at least one of the first named and another flanges and interconnecting the spring with the first named and another flanges to releasably maintain the casing and the housing against separation from the preselected assembly position thereof.

34. The method as set forth in claim 33 wherein the moving and engaging step includes disposing a part of the first named flange within a means for seating it on the another flange when the casing and housing are in the preselected assembly position thereof.

35. The method as set forth in claim 34 wherein the positioning and interconnecting step includes biasing a pair of generally opposite end portions of the spring into releasable engagement with a pair of generally opposite pair of retainers therefor on the another flange of the housing and engaging a part of the spring intermediate the opposite ends thereof with a confronting part of the first named flange so as to releasably maintain the seated part of the first named flange against displacement from the seating means on the another flange.

36. The method as set forth in claim 33 wherein the positioning and interconnecting step includes biasing the first named and another flanges between a pair of sets of tabs on a pair of opposite ends of the spring and seating a pair of abutments on the opposite ends of the spring in a pair of aligned sets of opposed grooves in the first named and other flanges, respectively.

37. A releasable combination of a starter device and a protector device for connection in a winding circuit of a dynamoelectric machine, the releasable combination comprising:

casing means for said protector device;

a bimetal switch element in said casing means;

housing means for said starter device with said housing means having a yieldable section including at least means integrally formed with said housing means and defining at least a partial pocket for receiving in releasable engagement at least an integral part of said casing means when said starter device and said protector device are in the releasable combination thereof, means in said at least partial pocket for the passage thereinto of said at least integral part of said casing means into the releasable engagement with said at least partial pocket, and a pair of means on said at least partial pocket generally defining at least a part of said passage means for releasably retaining said at least integral part of said casing means against displacement from the releasable engagement thereof with said at least partial pocket through said passage means when said starter device and said protector device are in the releasable combination thereof; and a PTCR in said housing means arranged in thermal coupling relation with said bimetal switch element when said starter device and said protector device are in the releasable combination thereof.

38. A releasable combination as set forth in claim 37 wherein said at least partial pocket includes means communicated with said passage means for seating said at least integral part of said casing means, at least said at least partial pocket being yieldable to effect the spreading apart of said releasably retaining means in response to an assembly force on at least one of said starter device and said protector device urging said at least integral part of said casing means into abutment with said releasably retaining means upon the passage through said passage means of said at least integral part of said casing means into said seating means.

39. A releasable combination as set forth in claim 37 wherein said at least partial pocket includes means for seating said at least integral part of said casing means with said seating means being sized so as to extend generally about at least a major portion of said at least integral part of said casing means, and said releasably retaining means being engaged with confronting portions of said at least integral part of said casing means to maintain said at least integral part of said casing means against displacement from said seating means through said passage means when said starter device and said protector device are in the releasable combination thereof.

40. A releasable combination as set forth in claim 37 wherein said yieldable section further includes an opening in said housing means, said at least partial pocket extending at least in part about said opening, and slot means extending through at least a part of said housing means intersecting with said opening for location in spaced relation generally between said releasably retaining means.

41. A releasable combination of a starter device and a protector device for connection in circuit relation with a winding circuit of a dynamoelectric machine, the releasable combination comprising:

casing means for the protector device;

a bimetal switch element in said casing means;

housing means for said starter device including a pair of interconnected housing members defining a chamber therewithin, and an opening in said housing means communicating with said chamber;

a PTCR in said chamber disposed at least generally adjacent said opening and arranged in thermal coupling relation with said bimetal siwtch element when said starter device and said protector device are in the releasable combination thereof; and one of said housing members having a yieldable section including at least flange means on said one housing member disposed at least adjacent said opening and sized so as to extend generally about at least a major portion of at least a part of said casing means for receiving it in releasable engagement when said starter device and said protector device are in the releasable combination thereof, means in said at least flange means for the passage of said at least part of said casing means therethrough into the releasable engagement with least flange means, and a pair of means on said flange means and defining at least in part said passage means for releasably retaining said at least part of said casing against displacement from the releasable engagement thereof with said at least flange means through said passage means when said starter device and said protector device are in the releasable combination thereof.

42. A releasable combination as set forth in claim 41 wherein said at least flange means includes means for seating said at least part of said casing means when said starter device and said protector device are in the releasable combination thereof, said at least part of said casing means being abutted with said releasably retaining means to effect yielding thereof along with at least said at least flange means in response to an assembly force exerted on at least one of said starter device and said protector device to effect the passage of said at least part of said casing means through said passage means into said seating means.

43. A releasable combination as set forth in claim 41 wherein said yieldable section further includes slot means through said one housing member for intersection with said opening to enhance the yieldability of said at least flange means.

44. A releasable combination of a starter device and a protector device for connection in circuit relation with a winding circuit of a dynamoelectric machine, the releasable combination comprising:

casing means for said protector device;

a bimetal switch element in said casing means;

housing means for said starter device with said housing means having a yieldable portion including at least a pair of means integrally formed with said housing means and arranged generally in opposed relation for receiving in releasable engagement at least an integral part of said casing means when said starter device and said protector device are in the releasable combination thereof, a pair of opposed groove means in said at least receiving means for seating said at least integral part of said casing means, respectively, a pair of means generally between said at least receiving means for the passage in one direction and another direction generally opposite thereto of said at least integral part of said casing means into said groove means, respectively, and a pair of sets of means on said at least receiving means arranged in opposed relation in displacement preventing engagement with confronting portions of said at least integral part of said casing means for releasably retaining said at least integral part of said casing means against displacement in the one and another direction from said groove means through said passage means when said starter device and said protector device are in the releasable combination thereof, respectively; and a PTCR in said housing means arranged in thermal coupling relation with said bimetal switch element when said starter device and said protector device are in the releasable combination thereof.

* * * * *

UNITED STATES PATENT AND TRADEMARK OFFICE
CERTIFICATE OF CORRECTION

PATENT NO. : 4,334,162

DATED : June 8, 1982

INVENTOR(S) : Donald L. Haag and Lee O. Woods

It is certified that error appears in the above—identified patent and that said Letters Patent is hereby corrected as shown below:

Col. 21, line 44, delete "4" and insert --3--.
Col. 24, line 26, delete "16" and insert --17--.
Col. 25, line 4, delete "havng" and insert --having--.
Col. 30, line 49, delete "siwtch" and insert --switch--.

Signed and Sealed this

*Fifteenth* Day of *January 1985*

[SEAL]

*Attest:*

GERALD J. MOSSINGHOFF

*Attesting Officer* *Commissioner of Patents and Trademarks*